US012636649B2

(12) United States Patent
Mann et al.

(10) Patent No.: US 12,636,649 B2
(45) Date of Patent: May 26, 2026

(54) COLLECTING DEVICE FOR A REACTION VESSEL UNIT AND REACTION VESSEL UNIT

(71) Applicant: BlueCat Solutions Gmbh, Neudrossenfeld (DE)

(72) Inventors: Wolfgang Mann, Neudrossenfeld (DE); Frank Feist, Lebanon, NH (US)

(73) Assignee: BlueCat Solutions GmbH, Neudrossenfeld (DE)

( * ) Notice: Subject to any disclaimer, the term of this patent is extended or adjusted under 35 U.S.C. 154(b) by 0 days.

(21) Appl. No.: 18/835,549

(22) PCT Filed: Feb. 2, 2023

(86) PCT No.: PCT/EP2023/052570
§ 371 (c)(1),
(2) Date: Aug. 2, 2024

(87) PCT Pub. No.: WO2023/148273
PCT Pub. Date: Aug. 10, 2023

(65) Prior Publication Data

US 2025/0153171 A1 May 15, 2025

(30) Foreign Application Priority Data

Feb. 4, 2022 (DE) ..................... 10 2022 102 705.8

(51) Int. Cl.
*B01L 3/00* (2006.01)

(52) U.S. Cl.
CPC ....... *B01L 3/502753* (2013.01); *B01L 3/5023* (2013.01); *B01L 2200/026* (2013.01);
(Continued)

(58) Field of Classification Search
None
See application file for complete search history.

(56) References Cited

U.S. PATENT DOCUMENTS 11,117,142 B2 * 9/2021 Mann ...................... B04B 11/04
2012/0308435 A1 * 12/2012 Fritchie .................. B04B 9/146
422/69

(Continued)

FOREIGN PATENT DOCUMENTS

DE 20 2014 010 544 U1 1/2016
DE 10 2017 113 583 A1 12/2018
DE 10 2021 124 023.9 3/2023

OTHER PUBLICATIONS

International Preliminary Report on Patentablity (IPRP) mailed May 6, 2024 from the European Patent Office from International Application No. PCT/EP2023/052570, filed on Feb. 2, 2023. 13 pages.

(Continued)

*Primary Examiner* — Lore R Jarrett
(74) *Attorney, Agent, or Firm* — HoustonHogle LLP

(57) ABSTRACT

The invention relates to a collecting device (30) for a reaction vessel unit (21), which has a plurality of reaction vessels (37), wherein the reaction vessels (37) each have an opening (38), which lie in a common opening plane (39), wherein the collecting device (30) has a collecting plate (31), which is designed in such a way that it can be arranged or is arranged opposite the openings (38) of the reaction vessels (37) in a centrifuge (1) and is designed such that it rotates with the reaction vessel unit (21) during Centrifuging and liquid emerging from the reaction vessels (37) is collected by the collecting plate (31) due to the centrifugal acceleration.

17 Claims, 13 Drawing Sheets

Figure 1A:
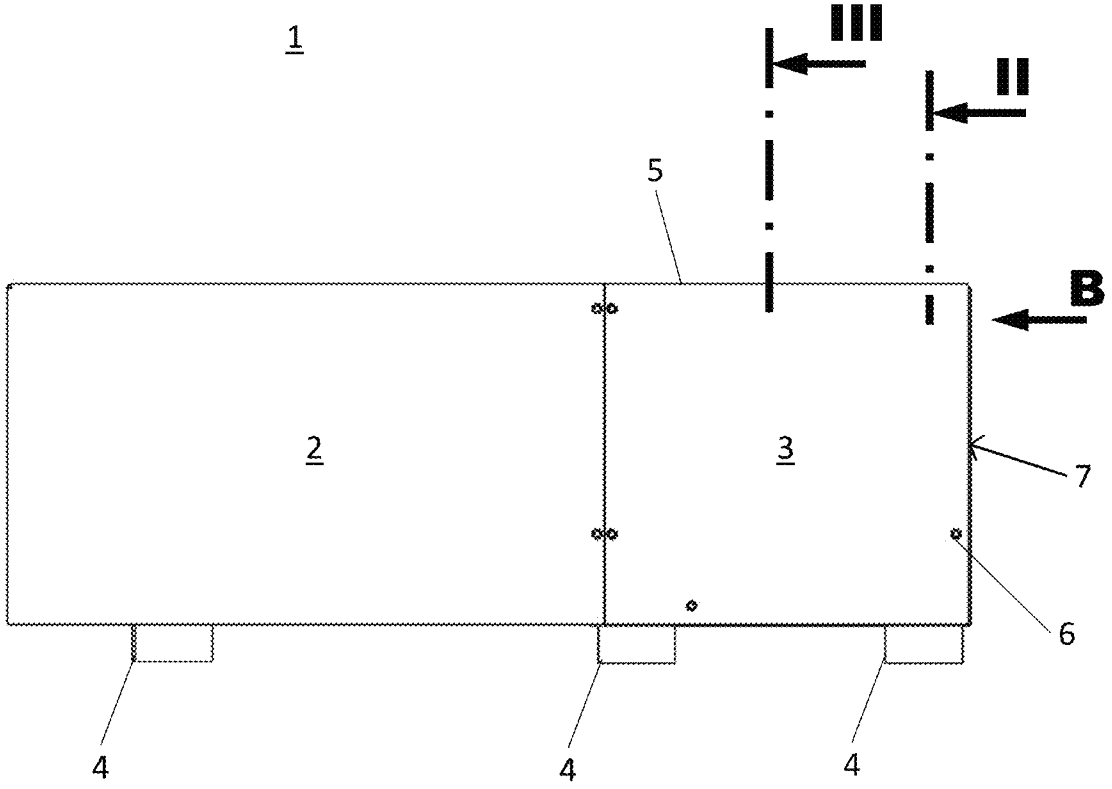

(52) U.S. Cl.
CPC ..... *B01L 2300/04* (2013.01); *B01L 2300/069* (2013.01); *B01L 2300/0829* (2013.01); *B01L 2400/0409* (2013.01)

(56) References Cited

U.S. PATENT DOCUMENTS

| | | | | |
|---|---|---|---|---|
| 2013/0152971 | A1* | 6/2013 | Kato | H10P 72/7608 134/21 |
| 2016/0187330 | A1* | 6/2016 | Wang | G01N 33/54326 506/3 |
| 2019/0022670 | A1* | 1/2019 | Mann | B04B 11/04 |
| 2021/0138485 | A1* | 5/2021 | Mann | B01L 13/02 |

OTHER PUBLICATIONS

International Search Report and Written Opinion of the International Searching Authority, mailed on Apr. 3, 2023, from International Application No. PCT/EP2023/052570, filed on Feb. 2, 2023. 13 pages.
German Search Report mailed on Dec. 23, 2022, from German Application No. 10 2022 102 705.8, filed on Feb. 4, 2022. 10 pages.
International Preliminary Examination Report (IPER) in German language, mailed May 6, 2024 from the European Patent Office as International Preliminary Examining Authority (IPEA), from International Application No. PCT/EP2023/052570, filed on Feb. 2, 2023. 7 pages.

* cited by examiner

COLLECTING DEVICE FOR A REACTION VESSEL UNIT AND REACTION VESSEL UNIT

RELATED APPLICATIONS

This application is a § 371 National Phase Application of International Application No. PCT/EP2023/052570, filed on Feb. 2, 2023, now International Publication No. WO 2023/148273 A1, published on Aug. 10, 2023, which International Application claims priority to German Application 10 2022 102 705.8, filed on Feb. 4, 2022, both of which are incorporated herein by reference in their entirety.

The present invention relates to a collecting device for a reaction vessel unit and a reaction vessel unit.

It is known that reaction vessel units comprising several reaction vessels, such as microtiter plates (MTPs) with their wells, are purified by centrifuging. The MTPs are picked up on a rotor in a rotor chamber of a centrifuge in such a way that the openings of the reaction vessels face away from an axis of rotation of the rotor and centrifuged at a speed of up to several 1000 rpm.

During Centrifuging, the centrifuged contents of the reaction vessels are collected by a wall of the rotor chamber. Some of the substances remaining on the walls and surfaces of the rotor chamber flow off and collect in the lower area, but they can also drip down from above and enter an MTP in the rotor chamber. If several MTPs are cleaned one after the other in the centrifuge, there is also a risk of cross-contamination if centrifugate from one MTP drips into another MTP.

The rotation of the rotor creates air vortices in every centrifuge. If liquid contents are ejected from the reaction vessels during rotation, these air vortices cause aerosols to form. These are also the cause of cross-contamination. In genomic applications (typically amplification-based, e.g. PCR), aerosols are therefore the driving force behind contamination.

It has also been shown that MTPs cleaned in the centrifuge can still be wetted on the surface even after the cells have been completely emptied. This can make further use more difficult, for example if the MTPs are subsequently sealed with a film. The foil is typically stuck on to cover the openings of the cells. This can be for sterile intermediate storage of the MTPs before further use or after filling with a test liquid to isolate the test regime. However, the wetted surface makes it difficult to cover the MTPs with a film.

DE 10 2017 113 583 A1 discloses a centrifuge in which the housing below the rotor has a drainage channel and the inner surfaces of the housing adjacent to the channel form a funnel which opens into the channel. This allows the centrifugate produced in the rotor chamber to be collected and discharged more easily.

It is known from DE 10 2021 124 023.9, unpublished at the time of this application, to supply a cleaning solution to the rotor chamber in such a way that the cleaning solution is distributed in the rotor chamber by rotating the rotor. Residues of the centrifugate can thus be removed from the walls and surfaces of the rotor chamber by regular, frequent rinsing with cleaning agents.

DE 20 2014 010 544 U1 discloses a centrifuge for cleaning a reaction vessel unit, in which a gap is provided between the inner surface and a rotor, so that a wind is generated by the rotation of the rotor, which drives the fluid ejected on the inner surface to a drain. The outlet is connected to a suction pump for extracting the fluid.

For reasons of hygiene, comparatively frequent cleaning cycles are required, which leads to idle times and high operating costs. This procedure will be unavoidable for diagnostic applications in particular.

One task of the invention is to reduce or reliably prevent the risk of contamination of a reaction vessel unit in a centrifuge.

A further task of the invention is to minimise or reliably prevent the wetting of a reaction vessel unit in a centrifuge.

A further task of the invention is to minimise the dwell time for aerosols in the centrifuge or to prevent the occurrence of aerosols.

A further task of the invention is to minimise the internal surfaces in the housing that can come into contact with the ejected liquid.

A further task of the invention is to minimise the volume of the space into which liquid particles can penetrate.

A further task of the invention is to reduce or eliminate the effort required to clean the rotor chamber of a centrifuge for MTP.

A further task of the invention is to keep ejected fluid away from all elements of the device, such as the housing, the rotor and the rotor axis, so that these parts do not corrode or are exposed to other chemical interactions with the ejected fluid, in order, among other things, to minimise costs incurred by surface treatments of the elements of the device for chemical protection and to speed up and simplify the manufacturing process.

One or more of the tasks is solved by the objects of the independent claims. Advantageous further embodiments are indicated in the respective subclaims.

According to a first aspect of the invention, a collecting device is proposed for a reaction vessel unit, which has a plurality of reaction vessels, wherein the reaction vessels each have an opening which lie in a common opening plane. The collecting device has a collecting plate which is designed such that it can be arranged or is arranged opposite the openings of the reaction vessels in a centrifuge, and is designed such that it rotates with the reaction vessel unit during centrifuging and liquid escaping from the reaction vessels is collected by the collecting plate due to the centrifugal acceleration.

For the purposes of the invention, a collection plate is a structure which has a surface opposite the opening plane of the reaction vessels. Liquid ejected from the reaction vessels by centrifugal acceleration can be collected on the surface and flow along under the effect of the centrifugal acceleration. In the simplest case, the collecting plate can be flat or essentially flat, arranged parallel to the opening plane and open at the edge, in particular the flanks. The collecting surface is preferably non-rotatably connected to the unit comprising the rotor and the reaction vessel unit and thus rotates at the same rotational speed as the rotor. As the flank-side edges of the collection plate are radially furthest away from the rotation axis, the collected liquid is driven from the centre to the flank-side edges of the collection plate due to the centrifugal acceleration and is propelled from there into the rotor chamber.

Ends of the rotor and thus also of the reaction vessel unit arranged thereon as well as of the collecting device which are opposite each other in the axial direction of the rotation axis are referred to as end faces in the context of the application, while those ends of the rotor and of the reaction vessel unit arranged thereon as well as of the collecting device which are opposite each other transversely to the rotation axis are referred to as flank sides or longitudinal sides in the context of the application. In use, the end faces are arranged transversely to the axis of the rotor and the flank or longitudinal sides are arranged parallel to the axis of the rotor.

In modifications, the collection plate can also be curved or kinked or inclined, as long as the collected liquid is directed away from an area opposite the opening plane of the reaction vessels. The liquid discharged by the collection device can be collected on the walls of the rotor chamber. Since the collection plate is arranged opposite the openings of the reaction vessels, the collection plate can also intercept liquid dripping from a wall, in particular the upper wall, of the rotor chamber and prevent the reaction vessel unit from being contaminated by the liquid. Even if several reaction vessel units are cleaned one after the other, cross-contamination can be prevented effectively and easily. The collecting device can be reused after cleaning. The collecting device can be made of plastic or metal, for example. Chemicals that break down or inactivate organic molecules can be used for cleaning, for example, provided the material of the collecting device is resistant to the chemical. An autoclave can also be used for cleaning, provided that the material of the collecting device is resistant to the temperatures used.

The collecting plate can be arranged at an angle with respect to the opening plane, so that collected liquid is discharged along the inclined collecting plate in the axial direction of a rotation axis of a rotor of the centrifuge due to the centrifugal acceleration in the centrifuge. The axial direction refers to a rotation axis of a rotor of the centrifuge. In the sense of the invention, inclined means that a height or a distance of the collecting plate varies with respect to the opening plane of the reaction vessels. The incline can be continuous or discontinuous (kinked), constant (straight) or variable along its length (curved). It can run from one end of the collecting device or the reaction vessel unit to the other end (on one side) or from the centre to both ends (on both sides). Since the opening plane of the reaction vessels usually runs parallel to the rotation axis when the reaction vessel unit is held in the centrifuge, the bevel also runs at an angle to the rotation axis. As the collection plate is inclined in the axial direction with respect to the opening plane or the rotation axis, the collected liquid is driven along the incline by the centrifugal acceleration to one end face of the rotor or the rotor chamber, where it can be collected or ejected. The walls of the rotor chamber surrounding the rotor are less wetted, so the risk of cross-contamination can be further reduced.

The collecting device can have an absorbent that is arranged and designed on the collecting plate in such a way that it can suck up the collected liquid.

Such an absorbent can, for example, be a porous material, such as a cellulose layer, and/or an open-cell foam. The liquid emptied from the reaction vessels during Centrifuging can be absorbed by the absorbent so that it cannot flow or drip back into the reaction vessels. Centrifuging forces the liquid into the absorbent and the capillary action of the absorbent holds it in place.

Such a collecting device is particularly suitable for centrifuges that are not designed for cleaning reaction vessel units and whose rotor chamber is, for example, difficult to access and therefore difficult to clean.

The collecting device can have flanks, which are preferably arranged circumferentially along the end faces and flank sides, so that the collecting device forms a kind of trough in which the liquid emptied from the reaction vessels during Centrifuging is collected.

If the space above the reaction vessel unit within the collection device is completely closed, the rotor chamber will not come into contact with liquid and contamination is ruled out in this respect.

It should be noted that the discharge in the axial direction does not exclude a superimposed movement of the liquid transverse to the rotation axis. In other words, the entire discharge movement of the liquid at the collecting plate is a combination of the axial discharge and the discharge transverse to the axis. Therefore, it may be advantageous if flanks of the collection device extending laterally along the rotation axis are drawn downwards from the collection plate to form an obstacle to movement of the liquid transverse to the rotation axis. In this way, collection of the collected liquid at an axial end can be favoured by the liquid drained off transversely to the axis also being drained off axially at the downwardly drawn flanks. This can further improve the concentration of the liquids at one end face.

In particular, the flanks and end faces of the collecting device can be designed to be flush with an edge of the reaction vessel unit. In other words, if the reaction vessel unit with the collecting device is placed on the rotor of the centrifuge, the collecting device formed in this way can be used to create a sealed collecting chamber which is isolated from the rotor chamber. The rotor chamber is not or hardly wetted, so the effort required to clean the rotor chamber of a centrifuge for reaction vessel units can be reduced or minimised. Since the collecting device rotates with the rotor, the air in the rotor chamber is not or hardly swirled, therefore wetting of the surfaces of the reaction vessel units during Centrifuging can be avoided. With little or no vortex formation, aerosol formation in the collection chamber is reduced or completely avoided.

At least one discharge opening can be formed on an end face towards which the collecting plate rises. The discharge opening is preferably flush or essentially flush with the inside of the collection plate. Collected and drained liquid is forced outwards and can be collected at the end face or drained further.

As the outer (flank-side) ends are located radially further outwards than the centre of the end face during centrifugation, the liquid will preferably collect there so that it can be discharged there best. It is therefore advantageous if two discharge openings are provided at the outer (flank-side) ends of the end face. The discharge openings can be on the end face, i.e. axially, or on the flank side, i.e. transverse to the axis. An opening at the top is also conceivable in principle, but means would then have to be provided to prevent dripping back from above and to avoid contamination.

The discharge opening can have a spout that protrudes beyond the end face. Such a spout moves in a circular path during centrifugation. Collected and discharged substance is propelled outwards and can be discharged via the spout into an annular collecting channel in which the spout runs. Contamination of the rotor chamber can be avoided even more effectively and cleaning costs can be further reduced. As explained above, it is advantageous if two discharge openings are provided, each with such a spout.

In embodiments, the collecting device can be placed loosely, preferably positively, on the reaction vessel unit. In this case, the collecting device can be provided separately from the centrifuge. The reaction vessel unit can be prepared for Centrifuging outside the centrifuge with the collecting device.

In further embodiments, the collecting device can be detachably connectable to the reaction vessel unit. Here too, the collecting device can be provided separately from the centrifuge. The reaction vessel unit can be prepared with the collecting device for centrifuging in a loss-proof manner. The connection can, for example, be a clip connection, a plug connection, a snap connection or a sliding connection.

In other embodiments, the collecting device can be detachably connectable to a rotor of a centrifuge. In this way, the rotor can be prepared to receive a reaction vessel unit. The collecting device can be removed for cleaning and is then ready for use again. The rotor can also be advantageously cleaned with the collecting device removed.

In further embodiments, the collecting device can be integrated with a rotor of a centrifuge. In this case, the rotor is ready to receive a reaction vessel unit without further preparation, and work steps in the laboratory can be simplified. The cleaning of the collecting device and/or the rotor chamber can be carried out together or separately by rinsing in the centrifuge or externally.

The collecting device can also be designed in several parts for easy removal and cleaning.

In still further embodiments, the collecting device can be connected or connectable to a rotor shaft of a centrifuge. The connection can be made, for example, by a cage or forked body or retaining bracket that can be mounted or flange-mounted in the centrifuge (on the rotor shaft) and holds the collecting device, or the collecting device itself has a bracket that can be mounted on the rotor shaft so that it cannot rotate. Here, too, the rotor is ready to receive a reaction vessel unit without any further preparation; it is not necessary to handle the cover on the reaction vessel unit or on the rotor. The rotor and collection device can be cleaned separately. Work steps in the laboratory can be simplified.

Cleaning can be carried out by rinsing in the centrifuge or externally (after disassembly from the rotor shaft).

The collecting device can be designed with a circumferential contour which is adapted to the shape of a corresponding reaction vessel unit, so that the collecting device can preferably be placed on the reaction vessel unit in a form-fitting manner and in particular in a circumferential form-fitting manner. This creates an essentially closed collecting chamber, which may only be opened by means of the discharge opening, so that the atmosphere contained therein is completely entrained during rotation in the centrifuge and there is no turbulence that causes aerosol formation.

The collecting device can have a contact contour in order to contact a reaction vessel unit which has a corresponding complementary contour, wherein the contact contour and the complementary contour are designed such that the collecting device can only be arranged in a single or unique position on the reaction vessel unit, so that the combination of reaction vessel unit and collecting device can be arranged in a centrifuge.

The contact contour and the complementary contour can thus be assembled according to the key/lock principle. This can ensure that the collecting device can only be arranged in a certain position in relation to the reaction vessel unit in order to prevent incorrect placement. For example, the contact contour and the complementary contour can be designed in such a way that if the collecting device is not correctly positioned on the reaction vessel unit, the collecting device protrudes further upwards on the reaction vessel unit so that the combination of reaction vessel unit and collecting device does not fit through an opening of the centrifuge or into a collecting area of the rotor of the centrifuge, for example. This ensures that the collecting device is not inserted and rotated in a centrifuge with an incorrect arrangement on the reaction vessel unit.

According to a further aspect of the invention, a corresponding reaction vessel unit is provided which has such a complementary contour which is designed to match the contact contour.

The complementary contour and the contact contour can, for example, be wave-shaped, zigzag-shaped or consist of pins and corresponding locating holes. However, any other contours are possible, which enable a clear assignment.

The reaction vessel unit can also have an asymmetrical insertion contour, which is positively adapted to a corresponding receiving contour of a rotor of a centrifuge in such a way that the reaction vessel unit can only be arranged in a single position in the rotor.

One such asymmetrical insertion contour is, for example, webs that protrude laterally along the flank sides of the reaction vessel unit without engaging in a corresponding groove in the rotor. This ensures that the reaction vessel unit is only inserted in a unique position in the rotor. This in turn corresponds to the key/lock principle.

Such a design of the reaction vessel unit is particularly advantageous in combination with the contact contour of the collecting device explained above and the corresponding complementary contour of the reaction vessel unit as well as the discharge opening of the collecting device, as this ensures that the discharge opening is always arranged on the correct side of the rotor on which the centrifuge is designed to discharge the liquid accordingly.

Furthermore, the collecting device can have projections in the area of a contact contour for contacting a reaction vessel unit, which protrude laterally in such a way that they can be gripped behind by guides of a rotor and thus fix the collecting device and the reaction vessel unit in the rotor so that they cannot rotate.

These protrusions can, for example, be webs that protrude laterally along the flank side and lie flat on the reaction vessel unit.

However, it is also possible that instead of the webs, only a few laterally protruding individual protrusions or small feet are formed, which can be used to guide the rotor.

In a preferred embodiment, a corresponding reaction vessel unit has one or more recesses for receiving the corresponding protrusions of the collecting device, so that the side of the projections facing away from the reaction vessel unit is flush with the remaining surface of the reaction vessel unit. With such a design of the reaction vessel units, it is possible to arrange the reaction vessel units with and without the collecting device in the rotor, wherein the reaction vessel unit without the collecting device and the reaction vessel unit with the collecting device are gripped behind with approximately the same small amount of play by the guide of the rotor and are thus fixed in the rotor so that they cannot rotate. Such a combination of collecting device and reaction vessel unit can also be used in corresponding centrifuges which are not designed to accommodate collecting devices. This combination is particularly advantageous in conjunction with a collecting device with an absorbent, which in particular has no discharge opening and hermetically seals the collecting chamber inside the collecting device from the rest of the rotor chamber.

The collecting device and/or the reaction vessel unit is preferably made of a polymer material. In particular, they are manufactured as injection moulded parts.

A discharge device may be provided, which is arranged in a rotor chamber of the centrifuge in which the rotor rotates and which is designed to collect liquid discharged by the collecting device. The collecting device can be designed depending on the type of liquid discharged by the collecting device. In particular, the collecting device can be designed to collect liquid that emerges from a discharge opening or spout of the collecting device during Centrifuging.

For example, the discharge device can have an annular channel open to the rotor chamber and concentric to the rotation axis, which is located opposite a discharge opening of the collection device. The channel can receive the collected and discharged substances from the collection device without contaminating the rotor chamber. In particular, the channel can have an annular opening in which a spout of the collecting device, from which liquid emerges during Centrifuging, can be received. Even without a spout, the discharged substances may be able to enter the channel simply due to the speed of the liquid and suitable arrangement.

The channel of the discharge device can be located opposite the discharge opening of the collecting device in the axial direction. In this way, the channel can accommodate a spout that extends in an axial direction from the collecting device and rotates in a circle when the rotor rotates. The liquid can be collected even more cleanly and safely. Since the channel receives the spout axially outside the end wall of the collecting device, liquid can pass from the channel onto the spout, but not onto an outer surface of the collecting device.

The channel can have an annular opening formed axially towards the rotor chamber, wherein the annular opening has an undercut radially inwards and/or radially outwards. This means that liquids can be collected even more safely and can flow freely and unhindered downwards in the channel, where they can be collected and, if necessary, drained or removed.

Liquid can be drained directly from the collecting device to the outside using an outlet device, which is formed at a lower end of the drainage device.

A further aspect of the invention relates to a method for cleaning a reaction vessel unit which has a plurality of reaction vessels, wherein the reaction vessels each have an opening which lie in a common opening plane, wherein the reaction vessel unit is received on a rotor of the centrifuge with its openings pointing outwards from a rotation axis of the rotor, and the rotor with the reaction vessel unit arranged thereon is rotated in the centrifuge so that a liquid contained in the reaction vessels is centrifuged out. With a collecting device with a collecting plate, which is arranged radially opposite the opening plane of the reaction vessels and rotates together with the reaction vessel unit, the ejected liquid is collected and discharged along the collecting plate. The collecting device and/or the centrifuge is preferably designed according to the description of the above aspects of the invention. The method has essentially the same advantages and effects as the collecting device and/or centrifuge described above. The reaction vessel unit can be held on the rotor in a manner known per se by form-fitting elements, such as rail-like clamps, into which the reaction vessel unit is pushed. For this purpose, an end wall of the rotor chamber can have a loading window through which the reaction vessel unit can be pushed into and pulled out of the rotor chamber. The use of the collecting device and the execution of the method depends on the type of design and arrangement of the collecting device and may comprise a loose or fixed attachment of the collecting device to the reaction vessel unit before or after the reaction vessel unit is arranged on the rotor, a detachable or non-detachable attachment of the collecting device to the rotor before or (only in the case of a detachable attachment) after the reaction vessel unit is arranged on the rotor, an attachment of the collecting device to a rotor shaft of the drive separately or together with the rotor. For example, a collecting device can be permanently attached to the rotor of the centrifuge. In this case, the reaction vessel unit is simply placed in the centrifuge on the rotor under the collecting plate of the collecting device. In other cases, the collection device may form an assembly with the reaction vessel unit which is assembled outside the centrifuge and loaded into and unloaded from the centrifuge together.

The collecting device can be cleaned after one or more centrifuging processes. Cleaning can be carried out by autoclaving and/or by chemical means and/or by irradiation. Cleaning the collecting device is simpler and less expensive than cleaning the entire centrifuge or the entire rotor chamber with rotor. Since the collecting device is provided, cleaning intervals of the centrifuge itself or the rotor chamber can be extended, especially if the collecting device forms a closed collecting chamber from which no or only little liquid enters the rotor chamber itself. A collecting device, which is provided within the rotor chamber of the centrifuge for collecting drained liquid from the collecting device, can be cleaned together with the collecting device or separately from it by the same or a different method. In a particularly simple way, the collecting device can be cleaned by centrifuging a reaction vessel unit filled with a cleaning solution. The collecting device can also be cleaned via the cleaning solution emerging from the collecting device.

A centrifuge rotor chamber can be cleaned after a specified number of centrifuging processes. Cleaning can be carried out by rinsing with a rinsing solution or by separately cleaning dismantled parts of the centrifuge that border the rotor chamber. Examples of suitable cleaning methods are autoclaving, chemical agents (biocides) or irradiation. Since the collecting device is provided, the specified number of centrifuging processes after which cleaning takes place can be greater, meaning that cleaning intervals of the centrifuge or the rotor chamber can be extended. A collecting device, which is provided inside the rotor chamber for collecting drained liquid from the collecting device, can be cleaned in the same operation or separately using a different process. Here, too, it is possible to clean the rotor chamber by Centrifuging a reaction vessel unit filled with a cleaning solution. This process is particularly easy to carry out if the collecting device is open at the flanks, as the cleaning solution can then easily enter the rotor chamber. If the collecting device is closed, the collecting device can be removed from the rotor before the cleaning cycle with cleaning solution so that the cleaning solution can reach the inner walls of the rotor chamber. If the rotor has two receiving locations for reaction vessel units, but only one of the receiving locations is provided with a collecting device that forms a closed collecting chamber, the reaction vessel units can be placed on the receiving location with the drainage device for cleaning the reaction vessel units, while the reaction vessel unit with the cleaning solution is placed on the receiving location without the collecting device for cleaning the rotor chamber. A cleaning solution can be dispensed with for cleaning the collecting device in the rotor chamber if the rotor or the discharge device is aerodynamically designed in such a way that the collecting device (for example a channel described above) is cleaned (blown out) by an air flow generated during rotation.

Figure 1B:
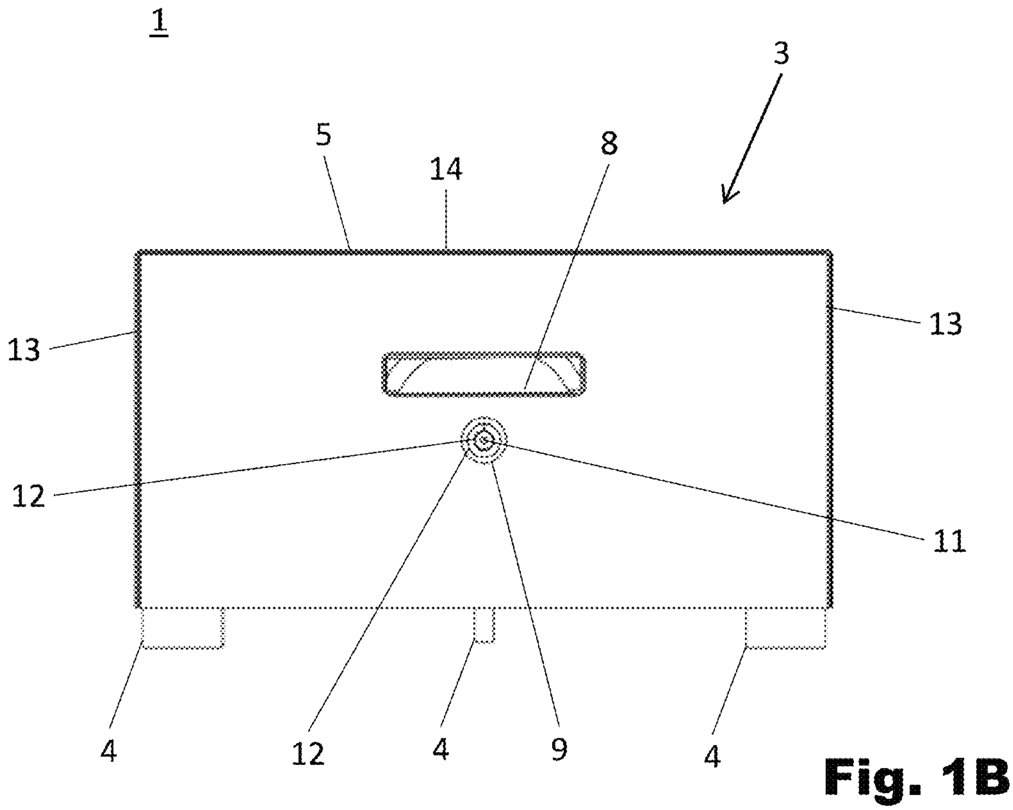
Figure 2:
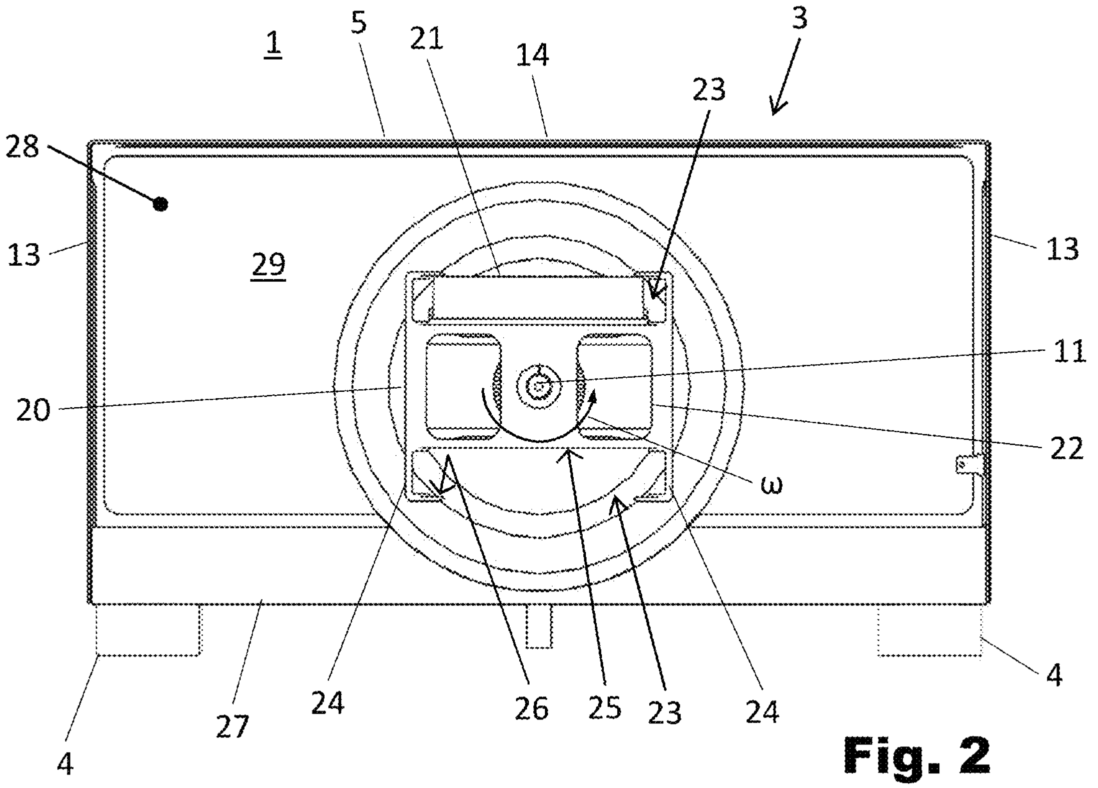
Figure 3:
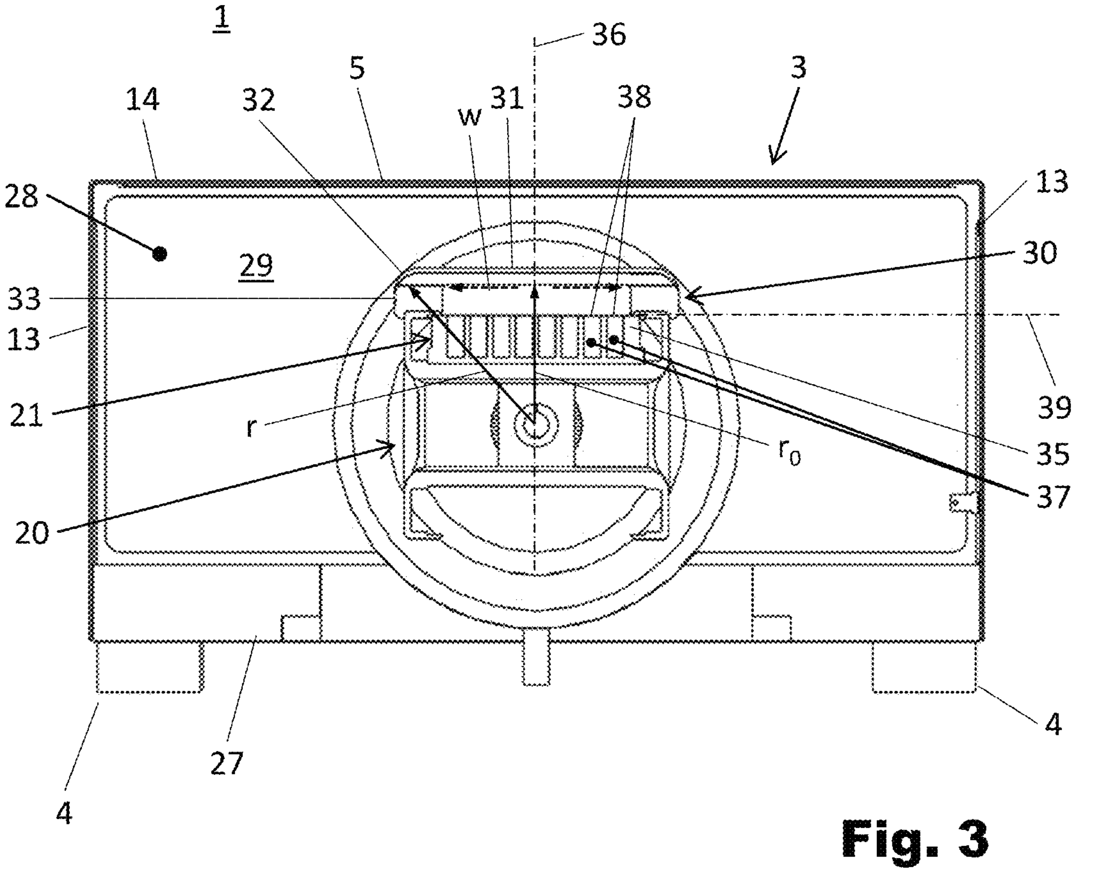
Figure 4A:
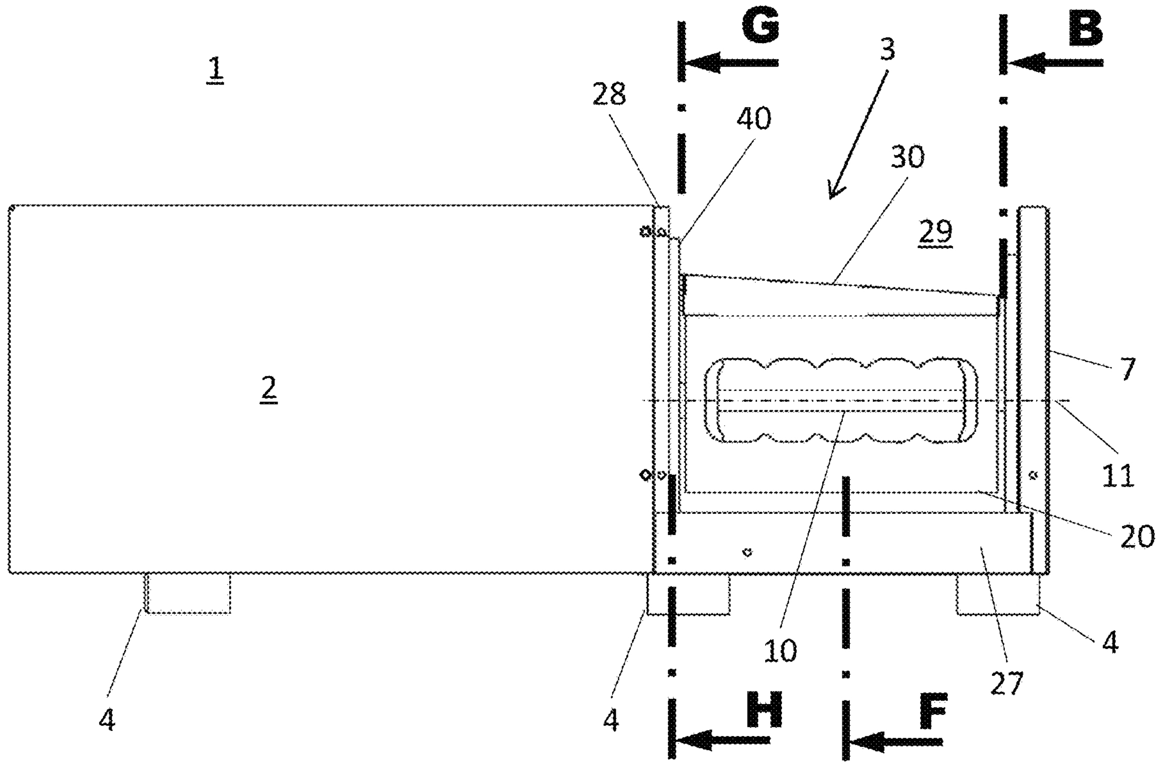
Figure 4B:
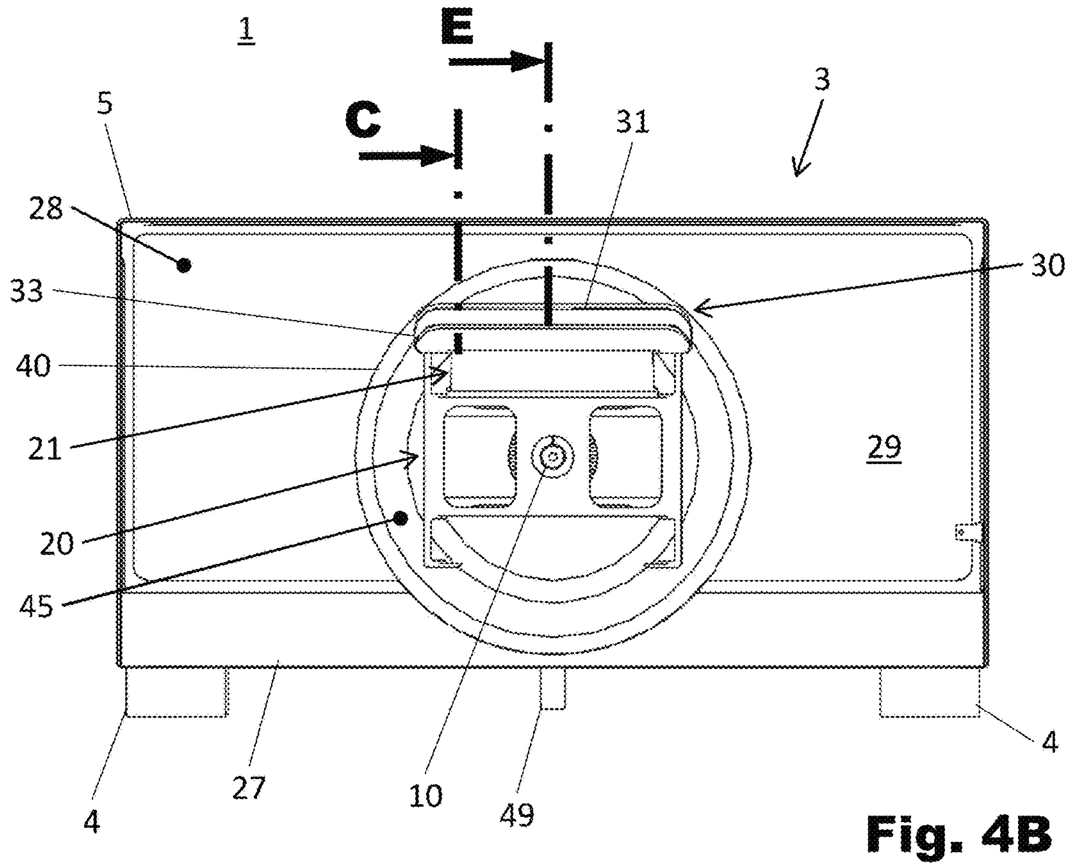
Figure 4C:
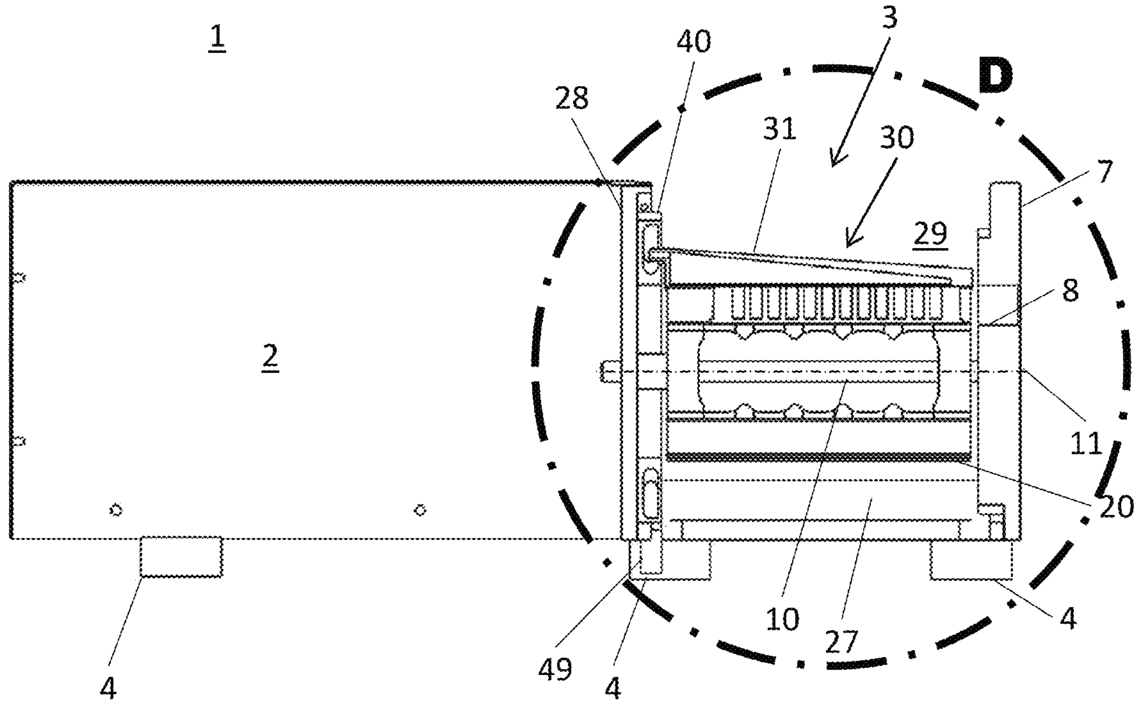
Figure 4D:
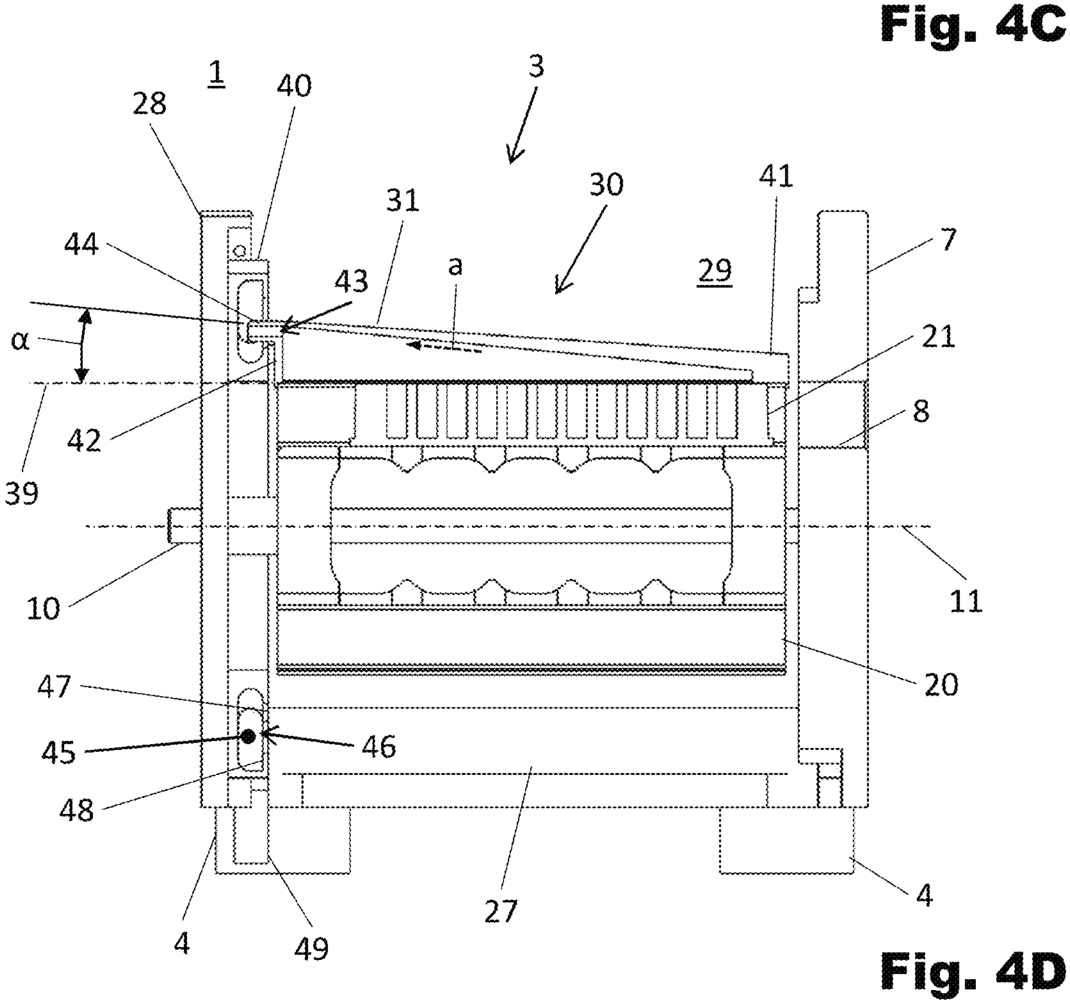
Figure 4E:
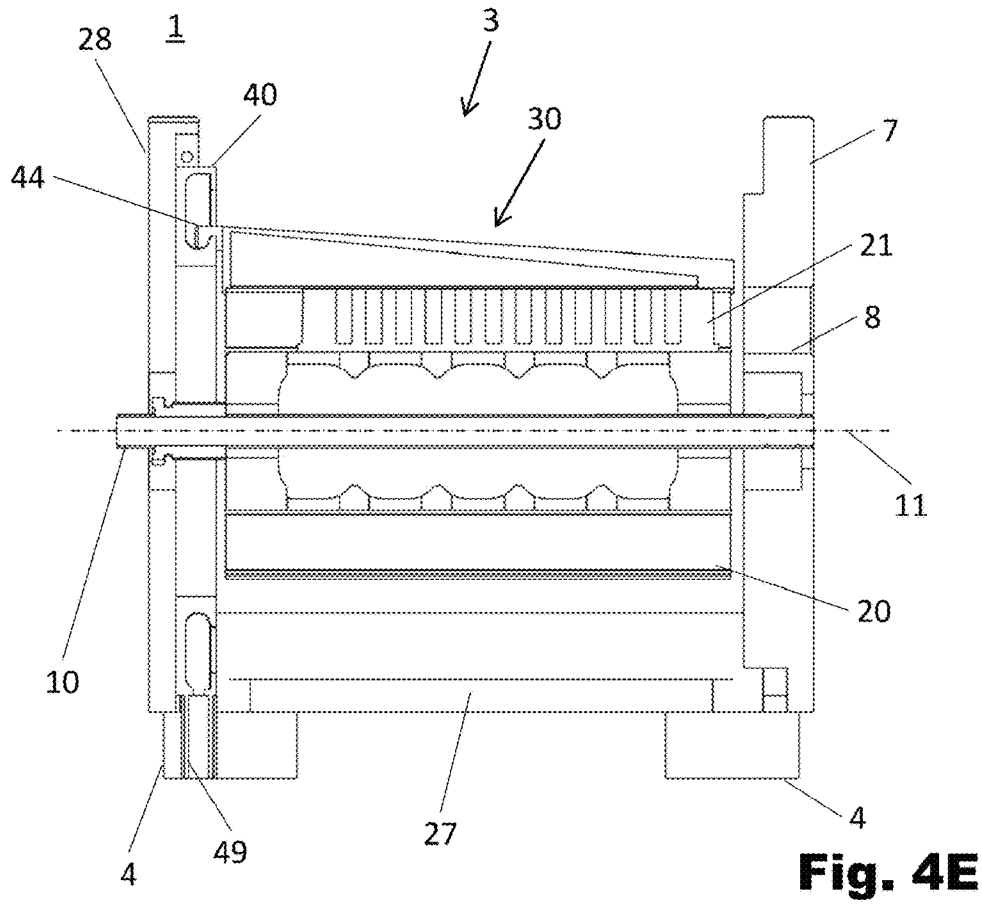
Figure 4F:
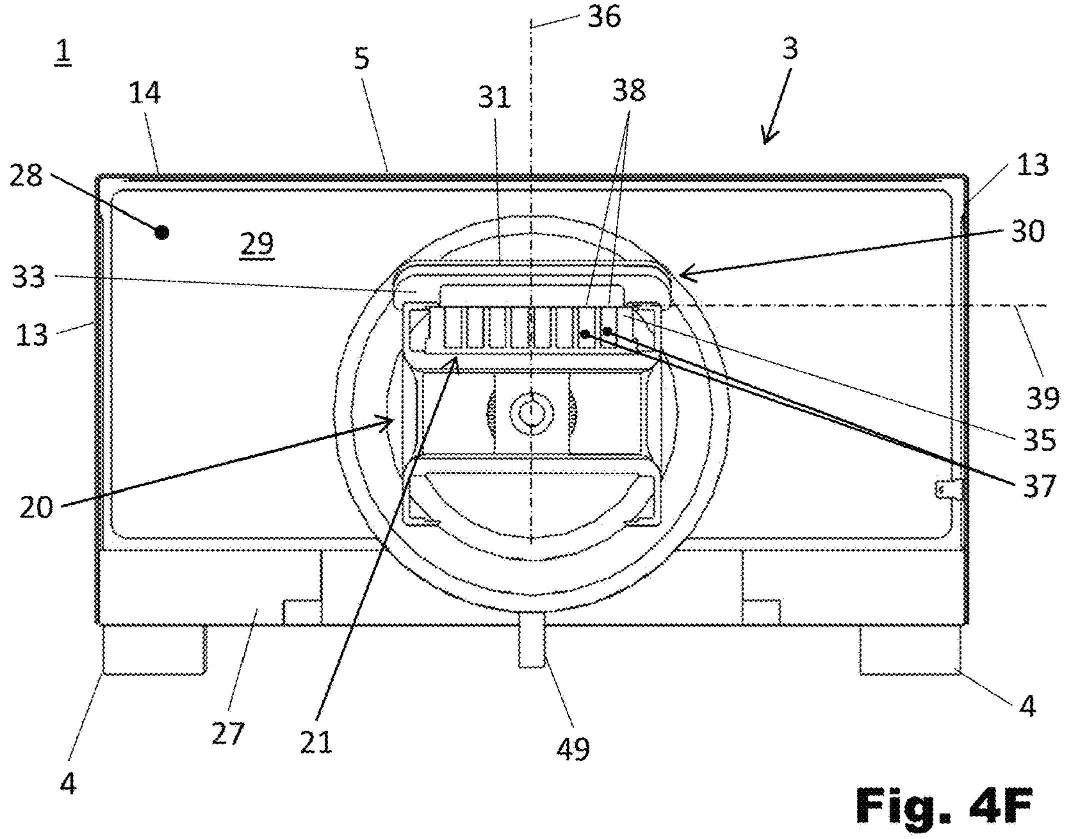
Figure 4G:
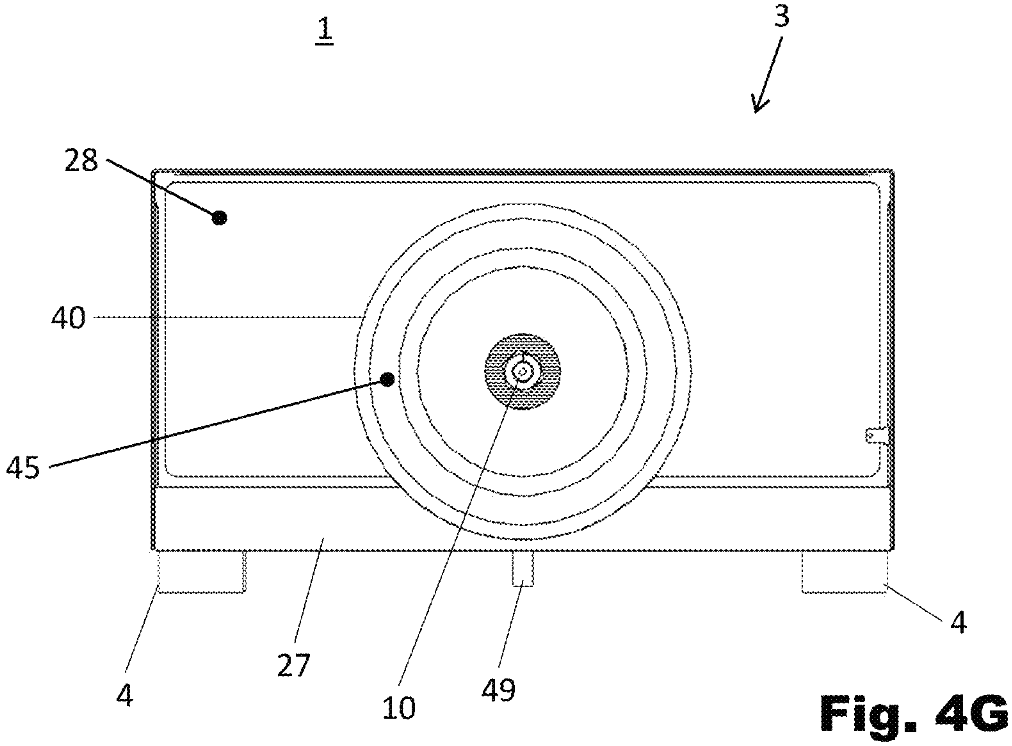
Figure 4H:
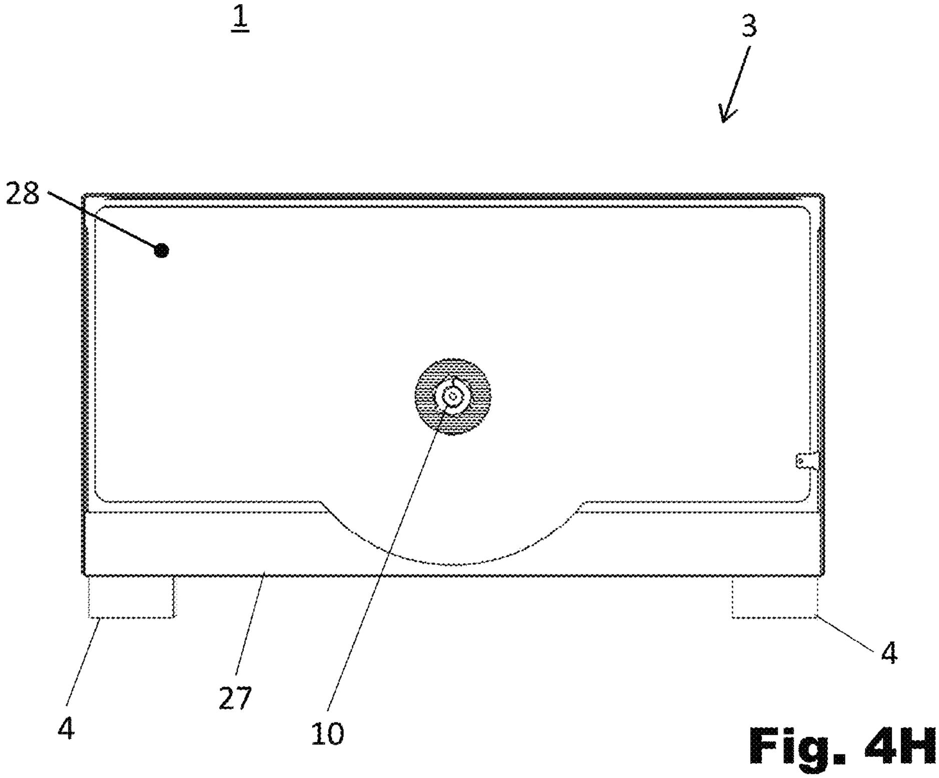
Figure 5A:
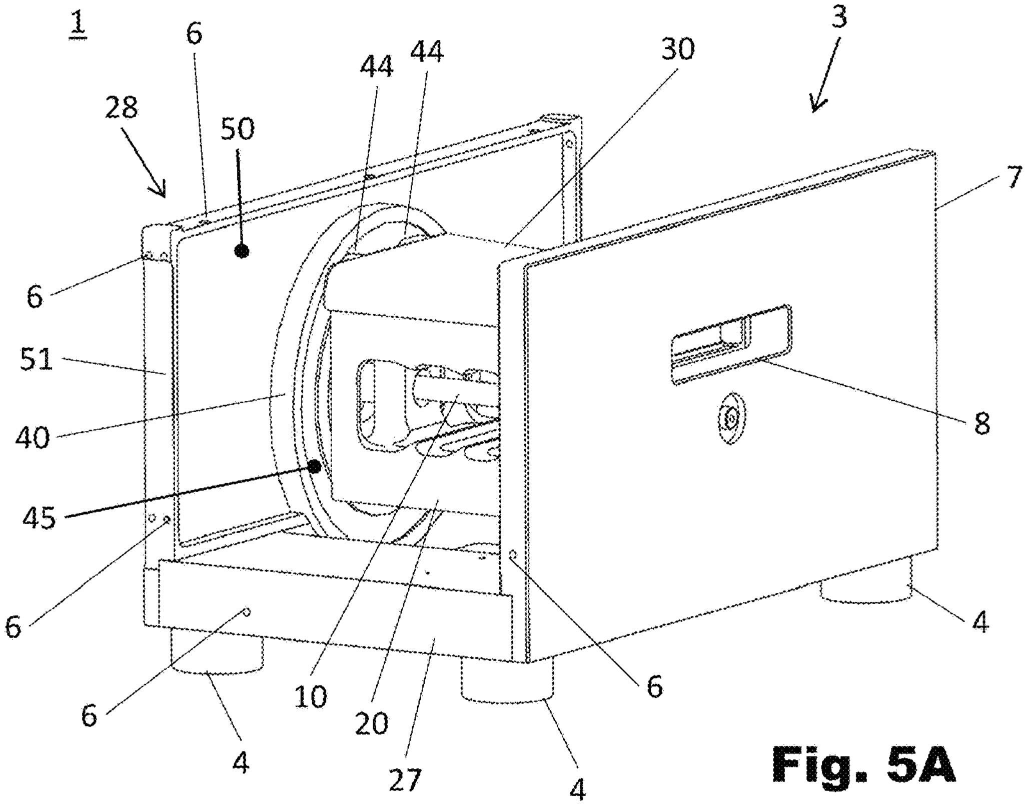
Figure 5B:
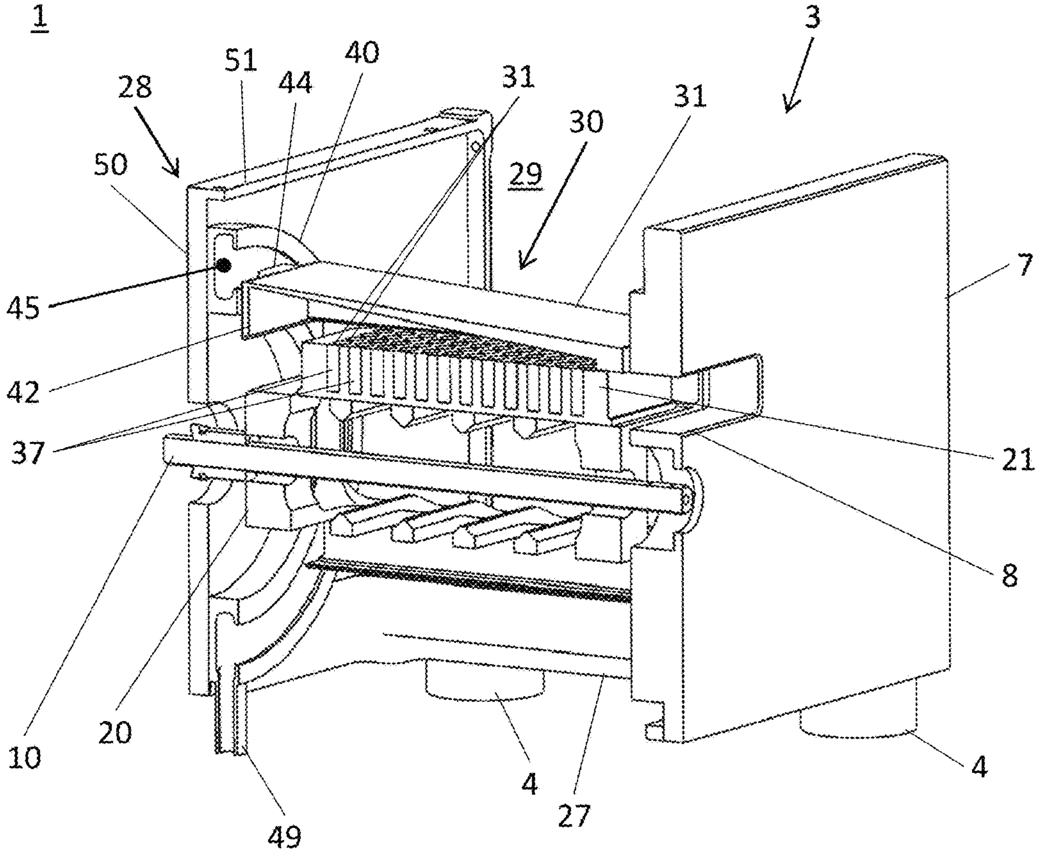
Figure 6A:
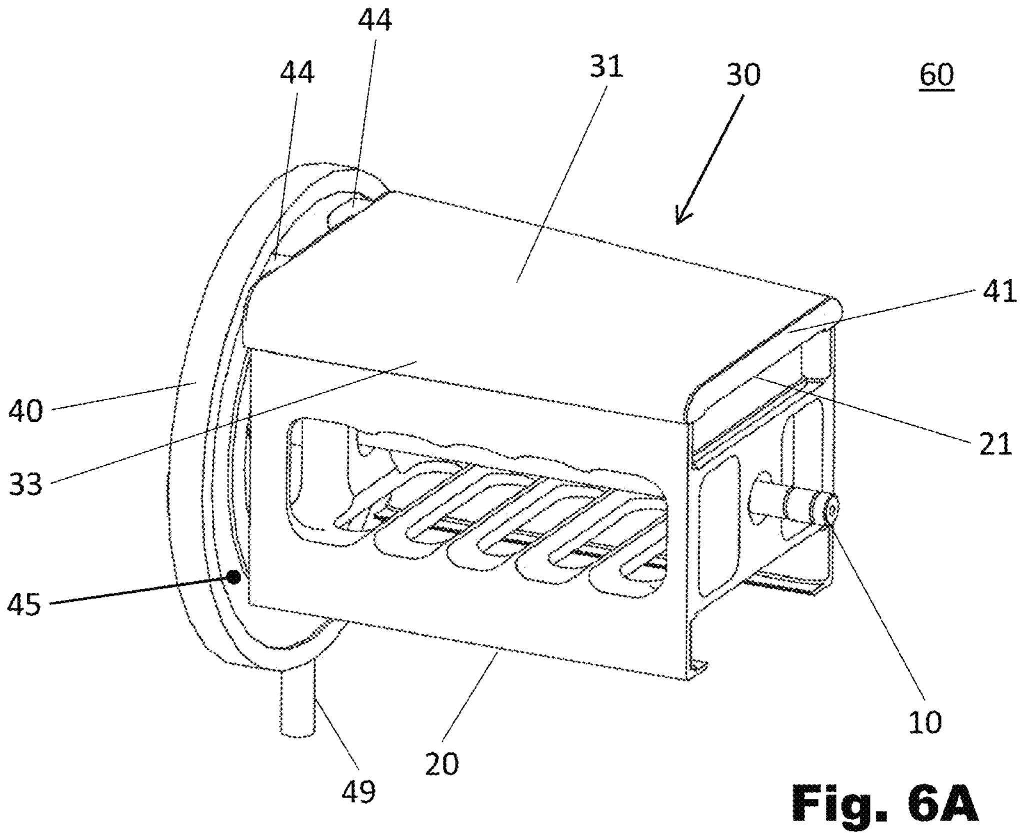
Figure 6B:
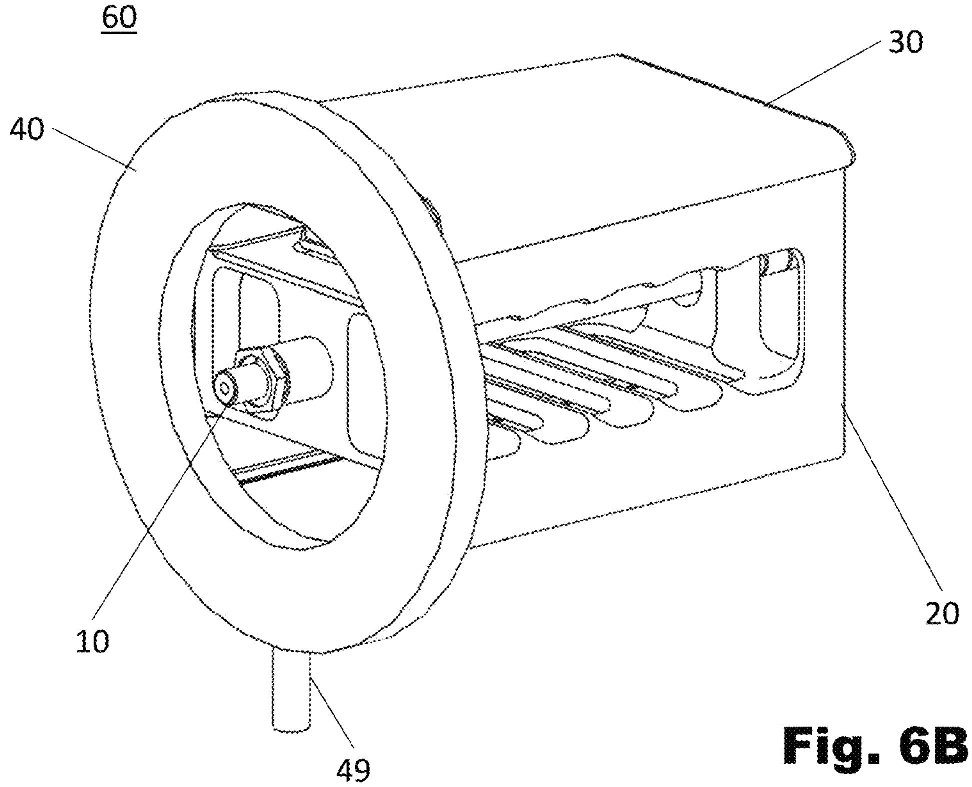
Figure 6C:
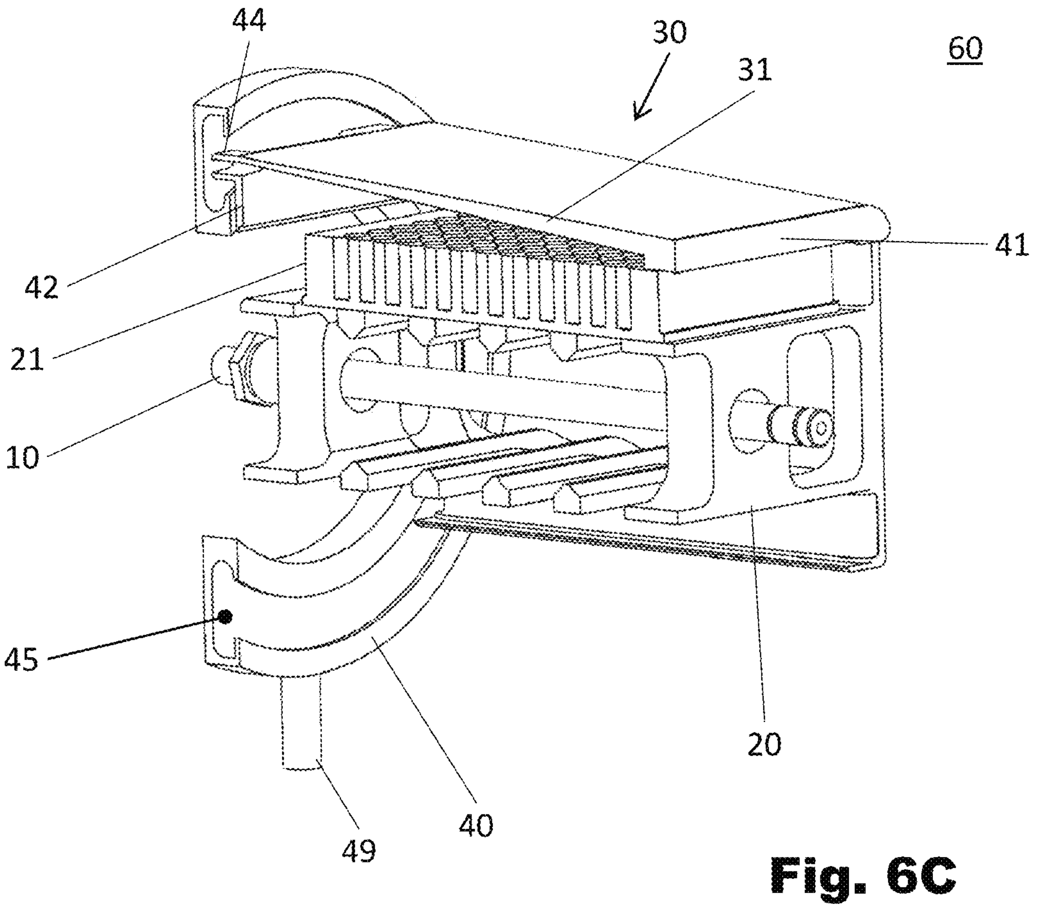
Figure 7A:
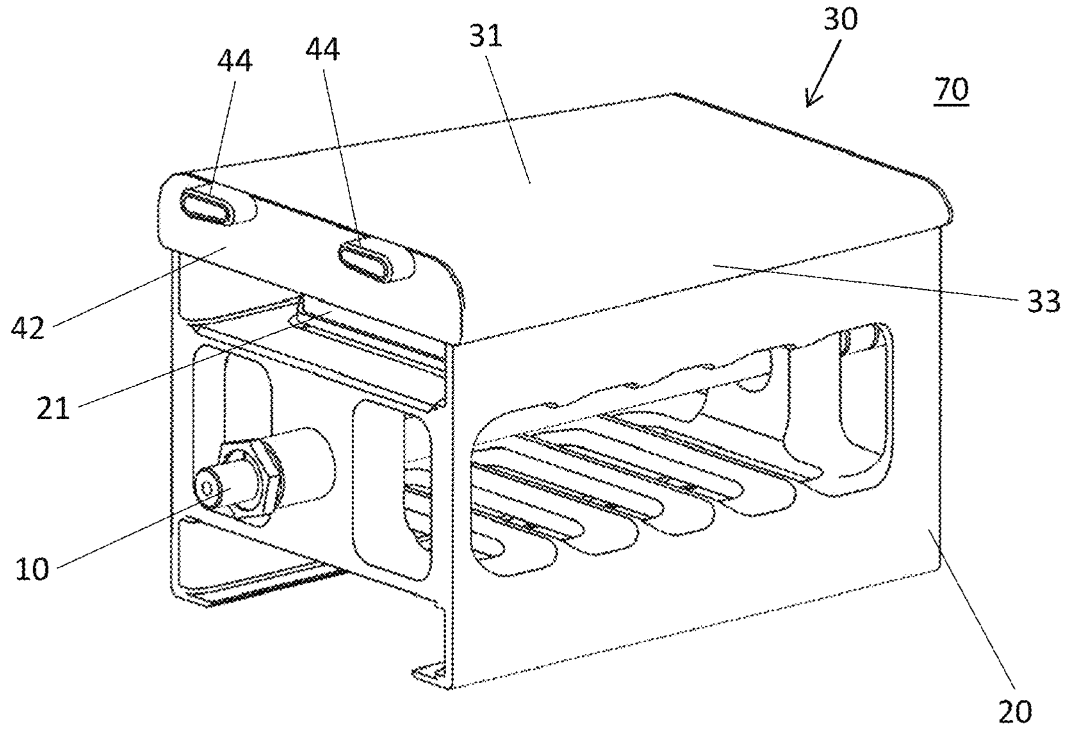
Figure 7B:
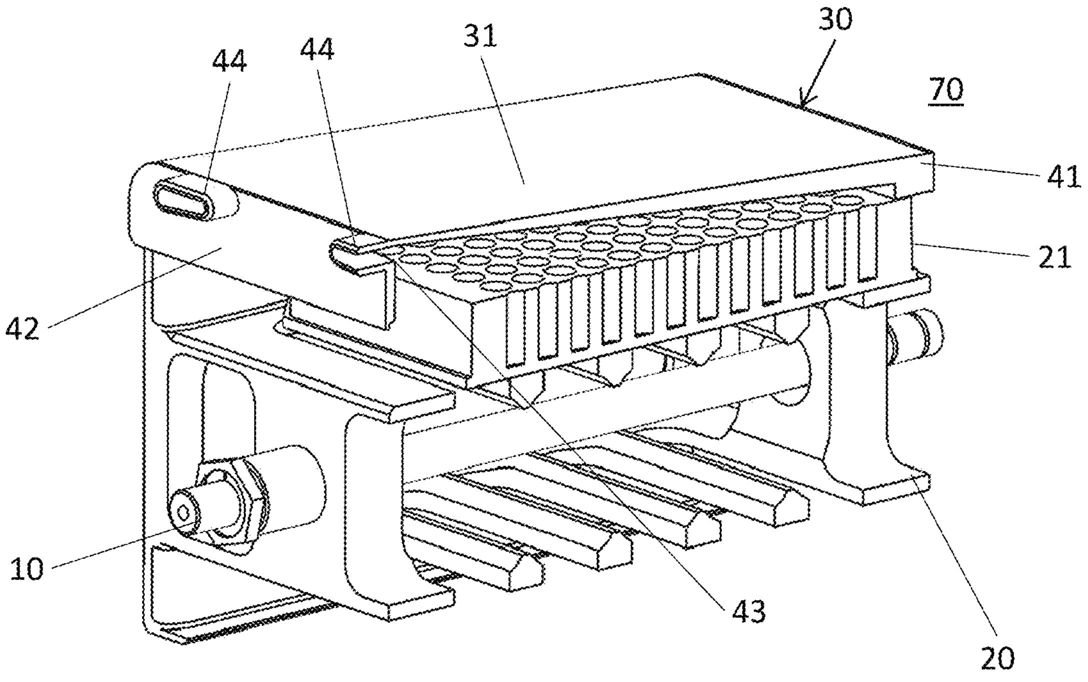
Figure 8:
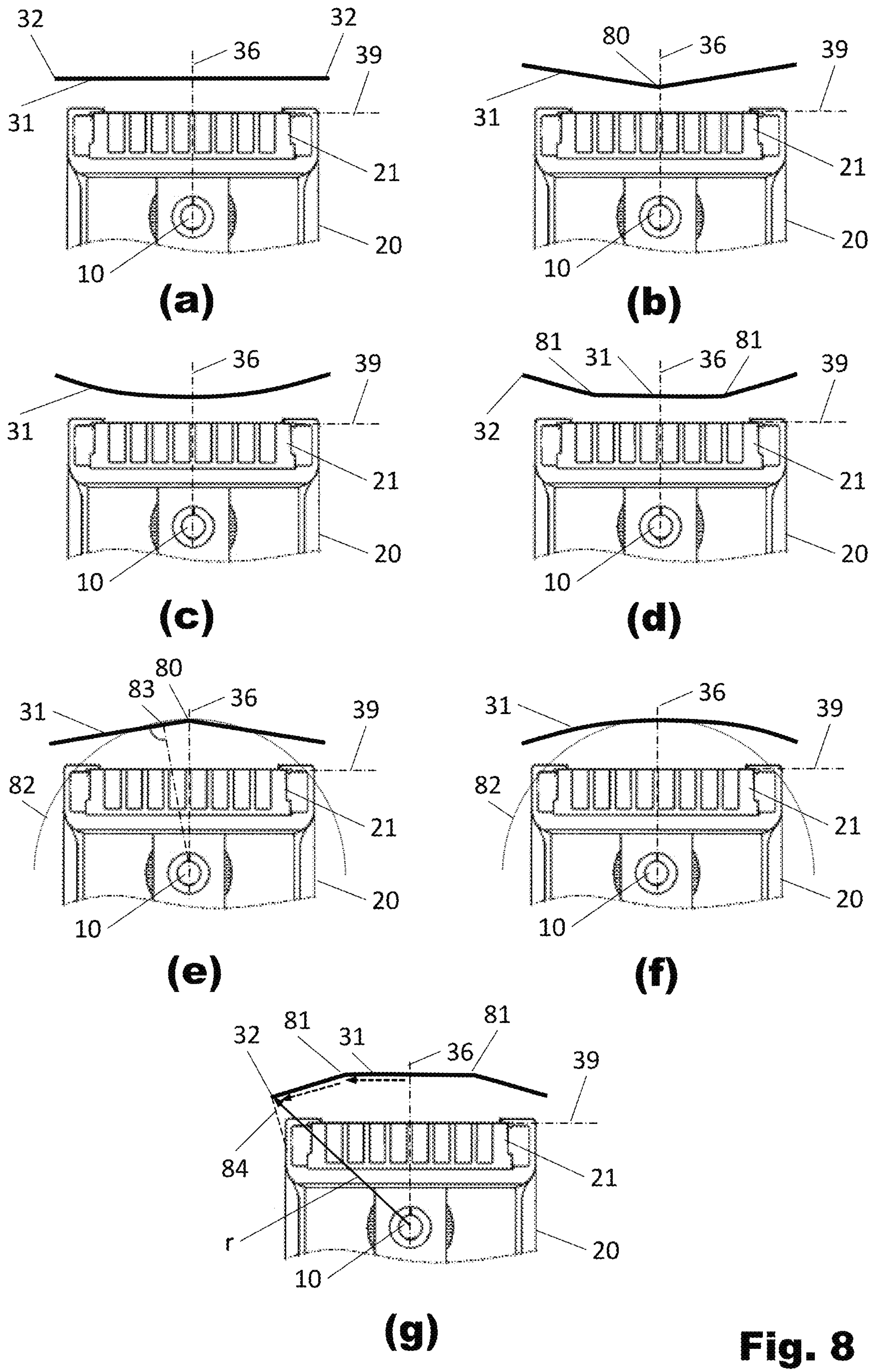
Figure 9:
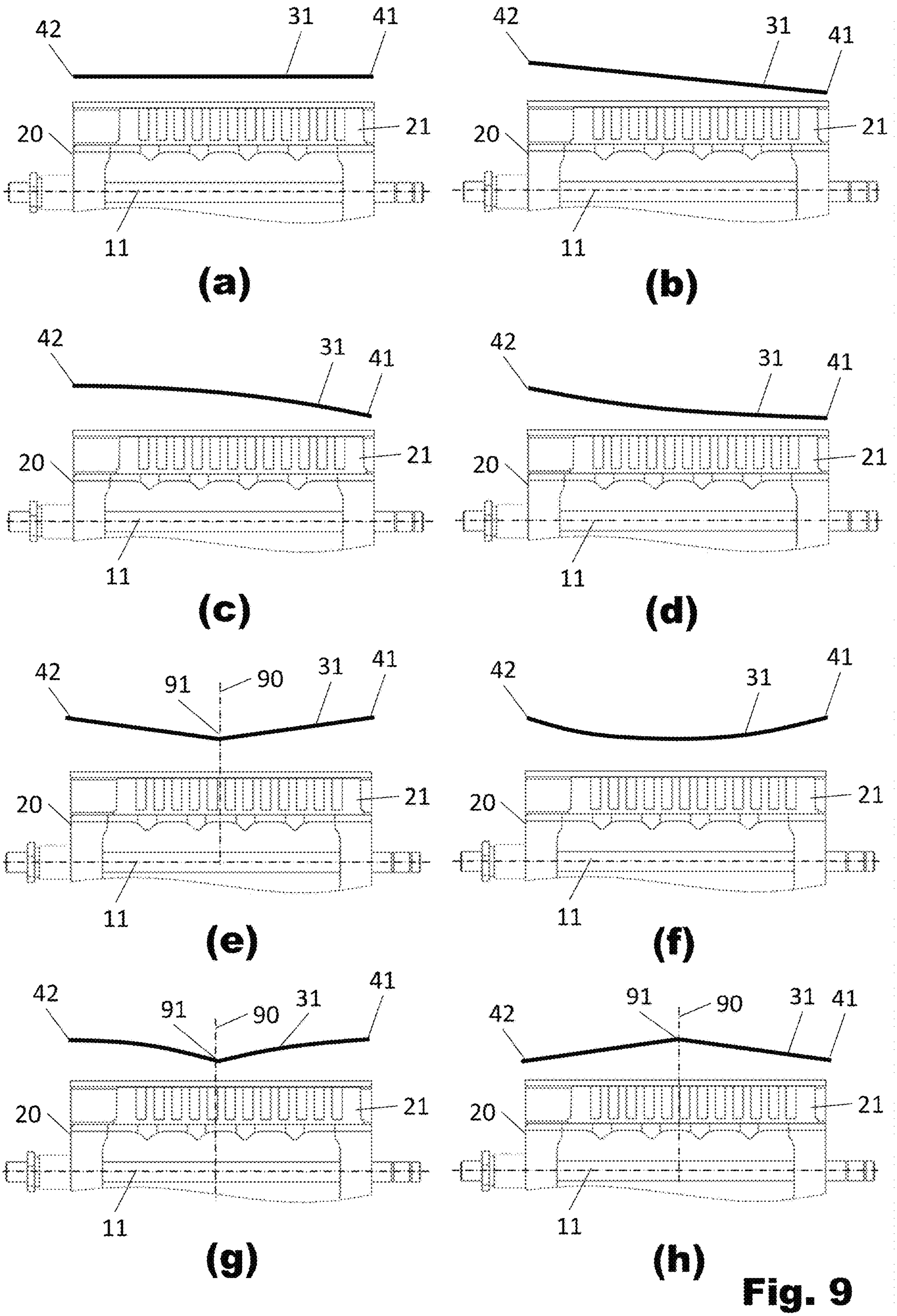
Figure 10A:
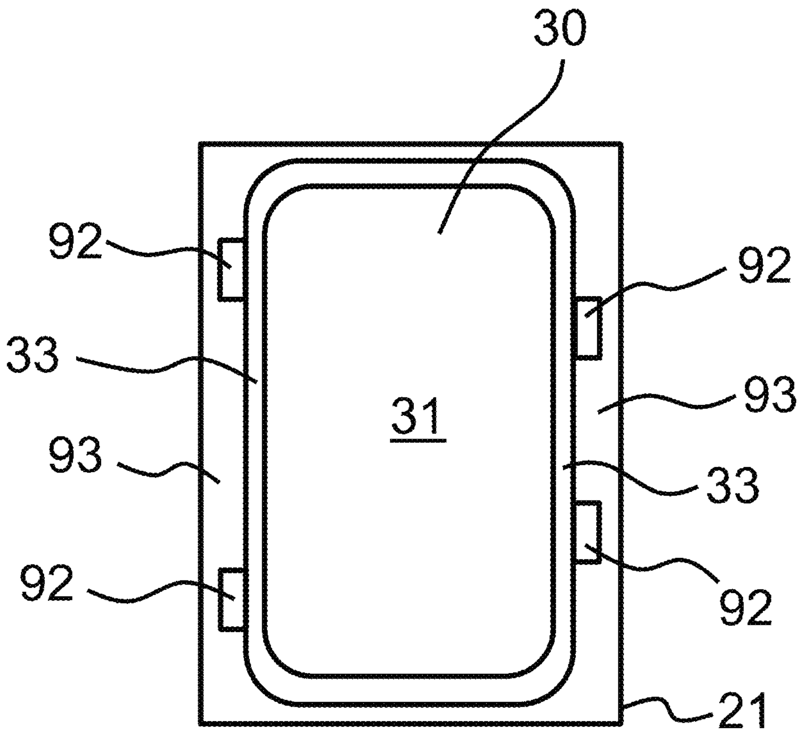
Figure 10B:
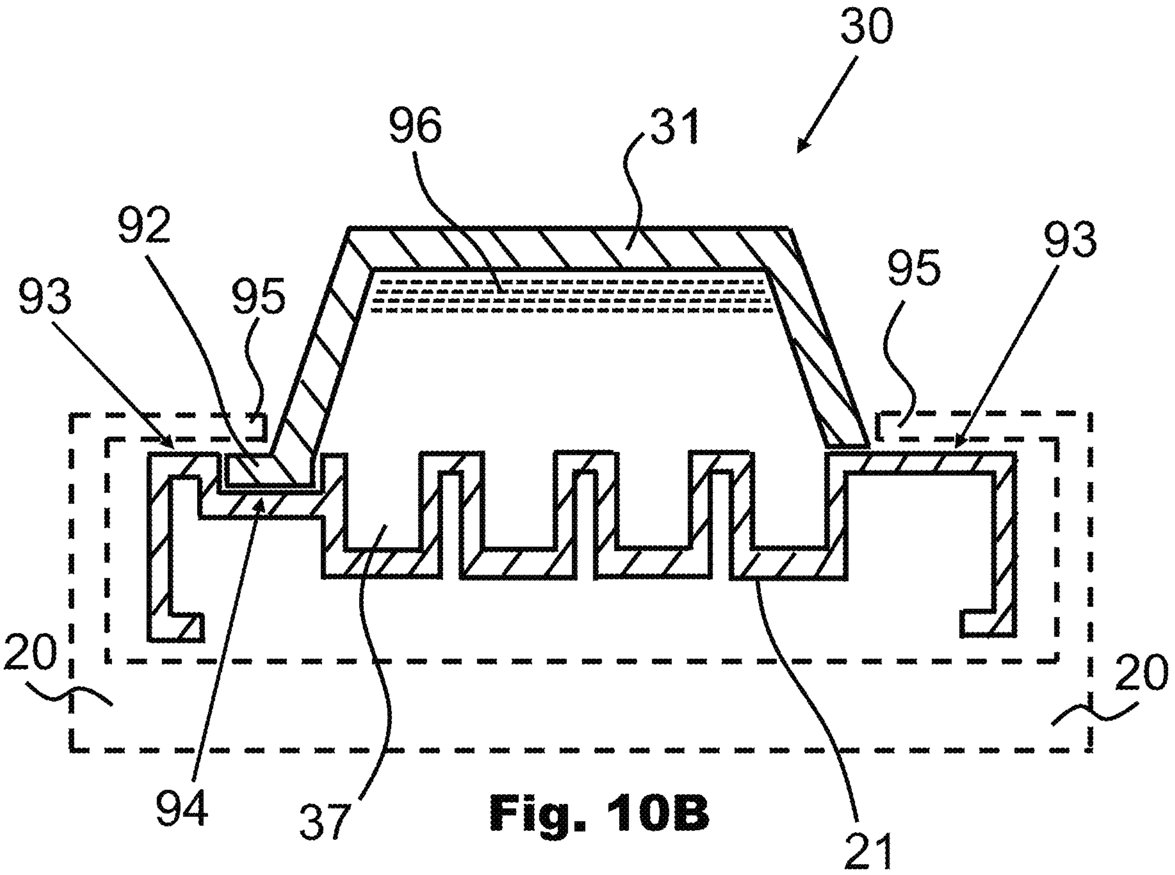

Selected embodiments of the present invention are described in detail below with reference to the accompanying drawings. It shows/they show:

FIG. 1A Side view of a centrifuge from the outside;

FIG. 1B The centrifuge of FIG. 1A in a frontal view in the direction of arrow "B" in FIG. 1A;

FIG. 2 An interior of a rotor box of the centrifuge of FIGS. 1A, 1B with a reaction vessel unit without collecting device in an end view with the end wall removed;

FIG. 3 The interior of the rotor box of FIG. 2 with a reaction vessel unit and with a collecting device according to the invention in an end-face sectional view corresponding to a sectional plane indicated in FIG. 1A by a line "μl";

FIG. 4A The centrifuge in a side view as shown in FIG. 1A with the hood removed;

FIG. 4B The centrifuge of FIG. 4A in a frontal view in the direction of an arrow "B" in FIG. 4A;

FIG. 4C The centrifuge of FIG. 4A with the hood removed, wherein a rotor box and elements therein are cut along a plane "C" in FIG. 4B;

FIG. 4D The rotor box of the Centrifuge from FIG. 4A in an enlarged view corresponding to a section "D" in FIG. 4C;

FIG. 4E The rotor box of FIG. 4A in a side view cut along a plane "E" in FIG. 4B;

FIGS. 4F,4G,4H The centrifuge of FIG. 4A in a frontal view in the direction of an arrow "F", "G" and "H" in FIG. 4A;

FIG. 5A Perspective view of the rotor box of the centrifuge from FIG. 4A;

FIG. 5B The rotor box from FIG. 5A in a perspective view cut along the plane "E" in FIG. 4B;

FIG. 6A Perspective view of an assembly with rotor shaft, rotor, collecting device and collecting device in the centrifuge with reaction vessel unit accommodated therein;

FIG. 6B The assembly of FIG. 6A in another perspective view;

FIG. 6C The assembly of FIG. 6A cut along the plane "C" in FIG. 4B;

FIG. 7A A perspective view of an assembly with rotor shaft, rotor and collecting device in the centrifuge with reaction vessel unit accommodated therein;

FIG. 7B The assembly of FIG. 7A cut along the plane "C" in FIG. 4B;

FIG. 8 Variants (a) to (g) of a contour of the collection plate with reaction vessel unit on a rotor in cross-section transverse or perpendicular to the rotation axis;

FIG. 9 Variants (a) to (h) of a contour of the collection plate with reaction vessel unit on a rotor in an axial section along the rotation axis;

FIG. 10A, 10Ba Collecting device and a reaction vessel unit in a top view and in a side view.

All graphic representations are to be understood schematically. Size ratios may be distorted for clarification. Unless otherwise indicated, directional and positional designations refer to the normal use of the subject of the invention.

A centrifuge 1 has a drive box 2 and a rotor box 3, which rest on feet 4 (FIGS. 1A, 1B). The drive box 2 houses a drive unit, such as an electric motor (not shown in detail). The drive box 2 has a hood 5, which is attached to a support structure of the rotor box 3 by means of screws 6. The support structure can be formed by an end wall 7 as well as by a base 27 and a rear wall 28 of the rotor box 3 (see, for example, FIG. 5A with screw holes 53 for mounting the hood 5). The hood 5 can have two side walls 13 and an upper wall 14, which are formed as individual elements or as a continuous angled sheet metal structure (see FIG. 2). The side walls 13 and the upper wall 14 of the hood 5 as well as the end wall 7, a base 27 and a rear wall 28 of the rotor box 3 define or surround an interior of the rotor box 3, which is also referred to as a rotor chamber 29. The end wall 7 has a loading window 8 (see FIG. 1B), via which an interior of the rotor box 3 is accessible in order to load the centrifuge with a reaction vessel unit 21 (FIG. 2), as is known per se. The end wall 7 can also have an axle opening 9 (FIG. 1B), which accommodates a rotor shaft 10 of the centrifuge 1 for rotation about a rotation axis 11. The axle opening 9 can also be designed as a bearing seat for a bearing 12 for mounting the rotor shaft, but the rotor shaft can also run freely in the axle opening 9.

The rotor shaft 10 carries a rotor 20, which is connected to the rotor shaft 10 in a rotationally fixed manner in order to rotate in an interior of the rotor box 3 (FIG. 2). For this purpose, the rotor shaft 10 is connected to an output shaft of the drive unit of the centrifuge 1. Alternatively, it is also conceivable that the rotor shaft 10 is an integral part of the output shaft of the drive unit. The rotor 20 is designed to accommodate at least one reaction vessel unit 21; in the present embodiment example, the rotor 20 can accommodate two reaction vessel units 21, of which only one is shown in the figure. The rotor 20 has a frame 22, which is approximately cuboid in shape and is connected or can be connected to the rotor shaft 10 in a rotationally fixed manner. On each of two axially opposite sides of the frame 22, a receiving location 23 is formed for a reaction vessel unit 21. In embodiments, only a single receiving location 23 or more than two receiving locations 23 can also be provided. The receiving location 23 is delimited by two rail-like clamps 24, which project from the frame 22. A support surface 25 for the reaction vessel unit 21 is formed on the frame 22 itself, while respective counter surfaces 26 are formed on the clamps 24, which are formed parallel to the support surface 25 and are spaced apart from the latter to fit in accordance with a height of the reaction vessel unit 21. The reaction vessel unit 21 can be placed on or removed from the rotor 20 in a manner known per se via the loading window 8 in the end wall 7 when the rotor 20 is in a position in which the receiving location 23 is exactly opposite the loading window 8. The loading process can be carried out automatically by means of a loading device, as is known from WO 2017/125598 A1. For this purpose, the loading device has an automatically operable displacement rod (not shown) for positioning a reaction vessel unit.

The reaction vessel unit 21 is a body with a plurality of individual reaction vessels 37, which are arranged next to one another in the reaction vessel unit 21 and each have an opening 38 on one side (FIG. 3). The openings 38 lie in a common opening plane 39 and point radially outwards for cleaning purposes. The clamps 24 of the receiving locations 23 are designed in such a way that they grip the reaction vessel unit 21 only at the edge, so that the openings 38 of the individual reaction vessels 37 of the reaction vessel unit 21 are exposed. When the rotor 20 rotates about the rotation axis 11 at a suitable rotational speed, liquids contained in the reaction vessels 37 of the reaction vessel unit 21 can be projected radially outwards. The liquid ejected from the reaction vessel unit 21 can be collected by the walls of the rotor chamber 29, in particular the inner sides of the side walls 13 and the upper wall 14 of the hood 5 as well as an upper width of the base 27, run off downwards from there and, if necessary, be collected and discharged, as is known per se. The rotational speed for this is a few 100 to a few 1000 rpm.

According to an embodiment example of the present invention, a collecting device 30 is provided, which is arranged radially outside the reaction vessel unit 21 (FIG. 3). The collecting device 30 has a collecting plate 31 which is arranged opposite the openings 38 of the reaction vessels 37. The collecting plate 31 extends beyond the dimensions of the rotor 20 both in the width direction w and in the axial direction (direction of the rotation axis 11). In modifications, it may be sufficient if the collecting plate 31 covers at least the reaction vessel unit 21 or at least all openings 38 of the reaction vessels 37 of the reaction vessel unit 21. When the rotor 20 rotates at a rotational speed suitable for centrifugation, liquid from the reaction vessels 37 is thrown through the openings 38 by the effect of the centrifugal force and intercepted by the collecting plate 31. In the area of a centre plane 36, which runs at right angles through the opening plane 39 of the reaction vessel unit 21 and along the rotation axis 11, a radial distance $r_0$ of the collecting plate 31 to the rotation axis 11 is the smallest, while the radial distance r increases in the width direction r towards the edge 32 of the collecting device. Accordingly, a centrifugal acceleration also increases towards the edge 32 of the collecting device 30, so that the collected liquid is driven along a surface of the collecting plate 31 in the width direction w towards the edge 32. A flank 33 of the collecting device 30 adjacent to the edge 32 of the collecting plate 31 can be open, so that the liquid propelled outwards is driven further beyond the edge 32 by the centrifugal acceleration and ejected into the rotor chamber 29. If the rotor 20 remains in the position in which the reaction vessel unit 21 can be removed via the loading window 8 of the end wall 7, the collecting device 32 prevents liquid dripping down from the upper wall 14 from returning into the reaction vessels 37, so that the reaction vessel unit 21 can be removed cleanly. In this way, cross-contamination processes can be effectively prevented when centrifuging several reaction vessel units 21 with different fillings.

If the edge 32 of the collecting plate 31 is, on the one hand, offset laterally from the reaction vessel unit 21 and, on the other hand, is drawn downwards, i.e. towards the rotor, a drip edge can also be formed, from which liquid can drip down next to the rotor 20 when the rotor 20 is stationary.

The edge 32 of the collecting plate 31 can also be pulled down so far that it retains the liquid ejected from the reaction vessel unit 21 during rotation and this only drips down the side of the rotor 20 when the rotor comes to a standstill. This can also significantly reduce wetting of the inner walls of the rotor chamber 29.

The collecting device 30 may be integral with the rotor 20 or attached or attachable thereto. In particular, the collecting device 30 can be removable from the rotor 20 so that it can be cleaned separately. The collecting device 30 may also be attachable to the rotor shaft 10 independently of the rotor 20 (not shown in detail).

In a further embodiment example, the collecting plate 31 of the collecting device 30 is designed to rise from a front end face 41 to an opposite rear end face 42 of the collecting device 30 (FIGS. 4A to 7B). This embodiment example is a preferred modification of the embodiment example of FIG. 3 and makes use of its features, unless otherwise described below. Here, the front end 41 is located on the side of the end wall 7 of the rotor box 3 as viewed in the axial direction, and the rear end 42 of the collection device 30 is located on the side of the rear wall 28 of the rotor box 3 as viewed in the axial direction. In other words, the collecting plate 31 has an incline which, in relation to the rotation axis 11 of the rotor 20, is designed to rise towards the rear end face 42 of the collecting device 30 and thus towards the rear wall 28 of the rotor box 3. An inner side of the collecting plate 31 forms a deflection angle α with the rotation axis 11 of the rotor 20 or with the opening plane 39 of a reaction vessel unit 21 held on the rotor 20 (FIGS. 4A, 4C). During the centrifugation process at a rotational speed, liquid trapped on the collection plate 31 is therefore driven along the incline (arrow direction a in FIG. 4C) to the rear end 42 of the collection device 30. Two discharge openings 43 are formed in the rear end face 42, each of which is adjoined by a spout 44 projecting from the rear end face 42 in the axial direction.

A collecting device 40 is provided on the rear wall 28 of the rotor box 3, which is adjacent to the drive box 2. The collecting device 40 can be formed integrally with the rear wall 28 or manufactured separately and connected to the rear wall 28. (It should be noted that the collecting device is also shown schematically in FIGS. 2 and 3, but is not functionally required there). In the present embodiment example, the collecting device 40 is a ring- or disc-shaped structure which is arranged on an inner side of the rear wall 28. However, the invention is not limited to this shape, and the collecting device 40 can in principle have any shape that is suitable for collecting and draining the liquid.

On the side facing the rotor 20, i.e. the inside, an annular channel 45 is formed in the collecting device 40. The channel 45 has an annular opening 46 pointing in the axial direction towards the rotor chamber 29. Behind the annular opening 46, the channel 45 widens radially inwards and radially outwards to form an inner undercut 47 and an outer undercut 48 with the annular opening 46. At the lowest point, the collecting device 40 has a drain device 49, which is connected to the channel 45. The two spouts 44 of the collecting device 30 protrude through the annular opening 46 into the channel 45. The liquid collected by the collecting device 30 on the collecting plate 31 collects under the effect of centrifugal acceleration at the outer (flank-side) ends of the rear end 42 of the collecting plate 31 in the width direction. From there, it passes via the discharge openings 43 into the spouts 44 and is discharged from there into the channel 45. In the channel 45, the liquid can flow downwards and be removed from the rotor chamber 29 through the drain pipe 49.

As all of the liquid ejected from the reaction vessel unit 21 is collected in the channel 45, the interior of the rotor box 3 (the rotor chamber 29) remains largely unwetted by the liquid. Only mist produced by turbulence can enter the rotor chamber 29 from the channel 45 and wet its walls.

In a preferred embodiment, the collecting plate 31 is designed such that it is flush with the lateral edges of the reaction vessel unit 21 and/or the rotor with flanks 33 or lateral walls, so that a substantially enclosed space is formed. As a result, the atmosphere inside the collecting plate 31 is entrained when the rotor rotates and is not or only barely swirled. This prevents the formation of aerosols that are distributed in the rotor chamber 29.

Only if the formation of such a contaminated mist cannot be prevented is it necessary to clean the interior of the rotor box 3 from time to time. In principle, the cleaning intervals can be considerably extended compared to a centrifugation process without the collecting device 30 and collecting device 40. The collecting plate 31 reliably protects the reaction vessel unit 21 from any contamination by any liquid dripping from the upper wall 14 of the hood 5. Since the collecting device 30 is also closed at the flanks 33, a closed space is formed with the reaction vessel unit 21 by the collecting device 30, so that any liquid mist which may prevail in the rotor chamber 29 cannot settle on a surface of the reaction vessel unit 21 and turbulence due to the rotation in the space between the reaction vessel unit 21 and the collecting plate 31 can be effectively prevented. The reaction vessel unit 21 can therefore be reliably and completely cleaned by centrifugation with the collecting device 30 of this embodiment example and protected from any wetting by the centrifugation process or contamination by falling droplets.

The invention has been described above with reference to preferred embodiments. It is understood that a wide variety of modifications are possible within the scope of protection of the invention. The shape of the collecting plate 31 depends on the desired effects. FIG. 8 schematically shows several variants 8(*a*) to 8(*g*) of a contour of the collection plate 31 with reaction vessel unit 21 in a cross-section (radial section) perpendicular or radial to the rotation axis 11. FIG. 9 schematically shows several variants 9(*a*) to 9(*h*) of a contour of the collection plate 31 with reaction vessel unit 21 in an axial section along the rotation axis 11. It is understood that further variants are conceivable in each case. The cross-sectional shapes of FIGS. 8 and 9 can be combined as desired. They can be designed with open or closed flanks.

The collecting plate 31 can be flat (FIG. 8(*a*)) in cross-section perpendicular to the rotation axis (FIG. 8)), with a central kink 80 along the rotation axis (FIGS. 8(*b*), (*e*)), with two lateral kinks along the rotation axis (FIGS. 8(*d, g*)) or curved (*c, f*), concave (FIGS. 8(*b*), (*c*), (*d*)) or convex (FIGS. 8(*e*), (*f*), (*g*)) when viewed from the outside. As described in connection with FIG. 2, the centrifugal acceleration in the cross-sectional plane transverse to the rotation axis 11 always acts in the direction of the larger radius r, therefore liquid collected on the inside of the collecting plate 31 will be driven towards the flank-side edges 32 even if the collecting plate is flat (FIG. 8(*a*)). This effect can be enhanced by a concave design, in which the edges 32 are drawn away (upwards) from the rotation axis (FIGS. 8(*b*), (*c*), (*d*)), but can be weakened by a convex design, in which the edges 32 are drawn towards the rotation axis (downwards) (FIGS. 8(*b*), (*c*), (*d*)). In the case of a convex shape with a central kink 80 (FIG. 8(*e*)), the collection plate initially slopes more steeply than a circumference 82 around the rotation axis. Therefore, liquid can accumulate in the area around the central kink 80 up to a reversal point 83, from which the collecting plate 31 falls flatter than the circumference 82. To avoid this, the shape with two lateral kinks 81, which are arranged beyond the reversal point 83, is preferable, as the liquid is then reliably drained from the central area to the outside (FIG. 8(*g*)). For the same reason, it is advantageous if the radius of curvature of the collecting plate 31 (FIG. 8(*f*)) is greater than the radial distance of the collecting plate 31 at the point closest to the axis, i.e. in the area of the centre plane 36, when the collecting plate 31 is convexly curved in cross-section.

In an axial section along the rotation axis (FIG. 9), the collecting plate 31 can be flat, i.e. at the same distance from the rotation axis 11 (FIG. 9(*a*)), inclined on one side, i.e. rising from a first end face 41 to a second end face 42 (FIGS. 9(*b*)-(*d*)), inclined on both sides, i.e. rising towards both end faces 41, 42 (FIGS. 9(*e*)-(*g*)) or descending (FIG. 9(*h*)), wherein the slope may be straight (FIGS. 9(*b*), (*e*), (*h*)) or curved (FIGS. 9(*c*), (*d*), (*f*), (*g*)), concave (FIGS. 9(*d*), (*e*), (*f*)) or convex (FIGS. 9(*c*), (*g*)) when viewed from the outside, wherein the inclined shapes on both sides can have a kink 91 between the end faces 41, 42. Due to the axial incline, which rises towards one or both end faces 41, 42, liquid is diverted due to the centrifugal acceleration along the inside or underside of the collecting plate 31 to the respective end face 41, 42 towards which the incline rises. The flow velocity can be slowed down by a convex shape towards the respective end face and accelerated by a concave shape. In the case of axially inclined shapes, it makes sense if the flanks are closed or at least drawn down far enough to create an obstacle to the flow transverse to the rotation axis, so that the liquid is only diverted to the end face(s) towards which the incline rises, where the liquid can be collected without wetting the rotor chamber. If the incline is on one side, the structural effort required to collect the liquid is lower, as a collecting device for the drained liquid only needs to be provided on one side. This is preferably provided on a rear wall of the rotor chamber, as the liquid can then be reliably drained away from the front side from which the reaction vessel unit is loaded. In the case of very large quantities of liquid to be drained, an incline on both sides can be advantageous, as the liquid can then be collected more quickly. A double-sided contour of the collecting plate 31, which rises from the end faces 41, 42 towards a cross-section 90, can concentrate the liquid in a kink 91 at the two flank-side edges. There, the liquid can be ejected laterally through the respective discharge openings. If necessary, a channel-like annular collecting device can be provided in the rotor chamber in the area of the cross-section 90, which collects the liquid ejected there and drains it downwards.

Other variants are conceivable. For example, the collecting device 30 can have a trough shape without further discharge openings. In this variant, it is advantageous if the collecting device 30 is mounted on the reaction vessel unit 21 outside the centrifuge 1 and the reaction vessel unit 21 is thus loaded into the centrifuge. In this case, the method should be modified so that the rotor remains in the lower position at the end of the centrifuging process, so that the collecting device 30 comes to rest below the reaction vessel unit 21, and the reaction vessel unit 21 with the collecting device 30 and the liquid collected therein is unloaded through an unloading window (not shown in detail) in the end wall 7 and separated from the collecting device 30, and the collecting device 30 is then freed from the liquid, cleaned and made ready for a further centrifuging process. With such a variant, the rotor chamber remains free of the centrifuged liquid even without a collecting device installed in it. No collecting device needs to be provided on the rotor, and cleaning of the rotor chamber and the collecting device can be made even easier.

It should be noted that the embodiment shown in FIG. 2 corresponds to a combination of the cross-sectional shape 8(*a*) with the axial sectional shape 9(*a*) with open flanks, and the embodiment shown in FIGS. 3A to 7B corresponds to a combination of the cross-sectional shape 8(*a*) with the axial sectional shape 9(*b*) with closed flanks.

A further embodiment example of a collecting device 30 (FIG. 10A, 10B) has a collecting plate 31 which is provided with circumferential flanks 33, so that the collecting device 30 is approximately trough-shaped. Laterally projecting projections 92 are formed on the collecting device 30 at the free edges of the flanks 33. The projections 92 can also be referred to as feet.

The reaction vessel unit 21, which has a plurality of reaction vessels 37, has a peripheral edge region 93 in which corresponding recesses 94 are provided for receiving the projections 92 (FIG. 10B). The recesses 94, which can also be referred to as positioning recesses 94, are designed in such a way that the projections 92 are received therein in such a way that the projections 92 are arranged with their upper side facing away from the reaction vessel unit 21 in alignment with the upper side of the remaining region of the edge region 93 of the reaction vessel unit 21. Such an embodiment has the advantage that the reaction vessel unit 21 can be arranged in a rotor 20 with or without a collecting device 30 and the edge region 93 of the reaction vessel unit 21 and possibly the projections or feet 92 of the collecting device 30 are engaged behind by a guide 95, so that the reaction vessel unit 21 with or without the collecting device 30 is securely fixed in rotation in the rotor 20.

The projections 92 are arranged unevenly on the two opposing flanks 33. As a result, the projections 92 engage in the recess 94 according to the lock-and-key principle only when the collecting device 30 is arranged exactly in a predetermined position or arrangement on the reaction vessel unit 21. Such a design of the projections 92 and the recess 94 is particularly advantageous if the collecting device has a discharge opening, which is used in particular with an inclined collecting plate 31 for discharging the liquid emptied from the reaction vessels 37.

The projections 92 and the recess 94 thus form a contact contour of the collecting device 30 and a complementary contour of the reaction vessel unit 21, respectively, which causes a clear assignment of the collecting device 30 to the reaction vessel unit 21, wherein the combination of reaction vessel unit 21 and collecting device 30 can only be arranged in the rotor 20 of the centrifuge if the contact contour and the complementary contour are correctly joined together.

It may also be expedient to provide a clear arrangement by means of corresponding contours between the reaction vessel unit and the rotor or the centrifuge. In this way, the rotor, the reaction vessel unit and the collecting device are clearly assigned to each other.

Providing the contact contour of the collection device or the complementary contour of the reaction vessel unit ensures that the reaction vessels are correctly covered.

In the embodiment example shown in FIGS. 10A, 10B, however, no discharge opening is provided, but the collecting device 30 is trough-shaped. An absorbent 96 is arranged on the side of the collecting plate 31 facing the reaction vessels 37. In the present embodiment example, the absorbent means is a cellulose pad. Such cellulose pads can be detachably arranged in the collecting device 30 and can be removed and disposed of after use. The cellulose pads can be provided with an adhesive layer for this purpose. Latching elements for fixing the absorbent 96 can also be provided in the collecting device 30.

In this embodiment example, the collecting device 30 and the reaction vessel unit 21 are held together in the rotor 20 during use by means of the guide 95, which is designed as an elongated guide rail, on the one hand and fixed in the rotor 20 on the other hand.

Within the scope of the invention, however, it is also possible to provide latching means on both the collecting device and the reaction vessel unit so that both are detachably connected to each other. However, the latching connection should be strong enough to withstand the centrifugal force occurring in the centrifuge.

The collecting device and the reaction vessel unit are designed for use in a centrifuge. However, they can also be used for manual emptying of the reaction vessels of the reaction vessel unit. This applies in particular to the trough-shaped design of the collecting device.

With the collecting device of the present invention, cross-contamination between reaction vessel units can be prevented, wetting of the reaction vessel units by aerosols in the rotor chamber can be reduced or completely avoided, depending on the design of the collecting device, and contamination of the rotor chamber by ejected liquid can also be significantly reduced or completely avoided. The latter can considerably simplify cleaning of the rotor chamber. If the liquids are completely absorbed in the channel 45 of the collecting device 40 and leakage into the rotor chamber is prevented, a closed rotor chamber can be dispensed with if necessary. In other words, the end wall 7 and the hood 5, and possibly also the base 27 (provided the latter is not required for reasons of stability) of the rotor box 3 can be omitted. This can considerably simplify the loading and unloading process of the rotor 20.

LIST OF REFERENCE SYMBOLS

1 Centrifuge
2 Drive box
3 Rotor box
4 Feet
5 Hood
6 Screw
7 Front wall
8 Loading window
9 Axis opening
10 Rotor shaft
11 Rotation axis
12 Storage
13 Side wall
14 Upper wall
20 Rotor
21 Reaction vessel unit
22 Frame
23 Receiving location
24 Clamp
25 Support surface
26 Counterface
27 Base
28 Back wall
29 Rotor chamber
30 Collecting device
31 Collecting plate
32 Edge
33 Flank
35 Edge
36 Centre plane
37 Reaction vessel
38 Opening
39 Opening plane
40 Collecting device
41 Front (first) end face
42 rear (second) end face
43 Discharge opening
44 Spout
45 Channel
46 Annular opening
47 Internal undercut
48 Outer undercut
49 Drain device
50 Plate
51 Frame
60 Assembly
70 Assembly
80 Central kink
81 Lateral kink
82 Perimeter
83 Reversal point
84 Surface normal
90 Medium cross-section
91 Kink
92 Projection
93 Edge region
94 Recess
95 Guide

96 Absorbent
a Discharge direction
r Radius
$r_0$ smallest radius
w Width direction
α Discharge angle

The invention claimed is:

1. A collecting device for a reaction vessel unit, the collecting device comprising:

a collecting plate for collecting liquid from a plurality of reaction vessels of the reaction vessel unit through openings of the reaction vessels, wherein the collecting device is configured to be installed with the reaction vessel unit in a centrifuge with the collecting plate arranged opposite the openings of the reaction vessels, and the collecting plate is configured to rotate with the reaction vessel unit during centrifuging, such that the collecting plate can collect liquid emerging from the reaction vessels due to centrifugal acceleration in the centrifuge during centrifuging, and opposing end faces, including a rear end face, wherein the collecting plate extends between the opposing end faces, and the collecting device is configured to be installed with the reaction vessel unit in the centrifuge with the collecting plate arranged obliquely with respect to a common opening plane in which the openings of the reaction vessels lie, such that the collected liquid can be discharged along the collecting plate in an axial direction of a rotation axis of a rotor of the centrifuge toward the rear end face due to the centrifugal acceleration, and wherein a discharge opening is formed on the rear end face and the discharge opening has a spout that projects beyond the rear end face.

2. The collecting device according to claim 1, wherein the collecting device has an absorbent arranged on the collecting plate in such a way that the absorbent sucks up the collected liquid.

3. The collecting device according to claim 2, wherein the absorbent is formed from a porous material, which includes a cellulose layer and/or an open-cell foam.

4. The collecting device according to claim 1, wherein flanks of the collecting device extending approximately parallel to the rotation axis and extending from the collecting plate towards the reaction vessel unit are drawn downwards from the collection plate so as to form physical barrier for liquid movement transverse to the rotation axis.

5. The collecting device according to claim 4, wherein the flanks and end faces of the collecting device are flush with an edge of the reaction vessel unit.

6. The collecting device according to claim 1, wherein the discharge opening is flush or substantially flush with the inside of the collecting plate.

7. The collecting device according to claim 1, wherein the collecting device is formed with a circumferential contour which is adapted to the shape of the reaction vessel unit, such that the collecting device is mountable on the reaction vessel unit in a circumferential form-fitting manner.

8. The collecting device according to claim 7, wherein the collecting device is detachably connectable to the reaction vessel unit.

9. The collecting device according to claim 1, wherein the collecting device is detachably connectable to the rotor of the centrifuge.

10. The collecting device according to claim 1, wherein the collecting device is integrally formed with the rotor of the centrifuge.

11. The collecting device according to claim 1, wherein the collecting device includes a contact contour, and the collecting device is configured to be installed with the reaction vessel unit in the centrifuge with the contact contour engaging a complementary contour of the reaction vessel unit, and the contact contour is shaped to permit engagement with the complementary contour and assembly of the collecting device to the reaction vessel unit in only a single relative position for placement in the centrifuge.

12. A reaction vessel unit for installation in the centrifuge with the collecting device of claim 11, the reaction vessel unit comprising the complementary contour, which is shaped to mate with the contact contour of the collecting device such that the collecting device is positionable on the reaction vessel unit in only one relative orientation.

13. The reaction vessel unit according to claim 12, wherein the reaction vessel unit comprises an asymmetrical insertion contour shaped to allow engagement of the asymmetrical insertion contour with a corresponding receiving contour of the rotor of the centrifuge, and the reaction vessel unit is configured to be installed with the collecting device in the centrifuge with the asymmetrical insertion contour permitting insertion of the reaction vessel unit into the rotor in only one relative orientation.

14. The collecting device according to claim 1, wherein the collecting device comprises laterally protruding projections in the region of a contact contour, the projections being shaped to be received behind corresponding guides of the rotor so as to retain the collecting device and the reaction vessel unit in a rotationally fixed position within the rotor.

15. The collecting device according to claim 1, wherein the collecting device is formed from a polymer material.

16. The collecting device according to claim 1, wherein the collecting device is configured to be installed with the reaction vessel unit in the centrifuge with the collecting plate non-rotatably connected to the reaction vessel unit, the rotor of the centrifuge, and/or a rotor shaft of the centrifuge such that the collecting plate can rotate with the reaction vessel unit during centrifuging and collect the liquid emerging from the reaction vessels.

17. The collecting device according to claim 1, wherein the collecting device is configured to be installed with the reaction vessel unit in the centrifuge with the collecting plate inclined in the axial direction, forming the oblique arrangement of the collecting plate with respect to the opening plane, in which a radial distance of the collecting plate from the rotation axis increases toward the rear end face, such that the collected liquid can be discharged along the collecting plate in the axial direction under the centrifugal acceleration.

* * * * *